United States Patent
Choe et al.

(10) Patent No.: US 12,284,536 B2
(45) Date of Patent: Apr. 22, 2025

(54) METHOD AND APPARATUS FOR REPORTING DATA TRANSMISSION PROCEDURE FAILURE FOR NETWORK OPTIMIZATION IN A WIRELESS COMMUNICATION SYSTEM

(71) Applicant: LG Electronics Inc., Seoul (KR)

(72) Inventors: Hyunjung Choe, Seoul (KR); Sunghoon Jung, Seoul (KR); Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 321 days.

(21) Appl. No.: 17/792,821

(22) PCT Filed: Jan. 27, 2021

(86) PCT No.: PCT/KR2021/001079
§ 371 (c)(1),
(2) Date: Jul. 14, 2022

(87) PCT Pub. No.: WO2021/153983
PCT Pub. Date: Aug. 5, 2021

(65) Prior Publication Data
US 2023/0052766 A1 Feb. 16, 2023

(30) Foreign Application Priority Data
Jan. 29, 2020 (KR) .................. 10-2020-0010651

(51) Int. Cl.
*H04W 24/10* (2009.01)
*H04L 1/20* (2006.01)
(Continued)

(52) U.S. Cl.
CPC ............ *H04W 24/02* (2013.01); *H04L 1/203* (2013.01); *H04W 24/10* (2013.01); *H04W 76/19* (2018.02); *H04W 76/38* (2018.02)

(58) Field of Classification Search
None
See application file for complete search history.

(56) References Cited

U.S. PATENT DOCUMENTS 9,272,851 B2  3/2016  Hwang et al.
9,743,456 B2  8/2017  Chang et al.
(Continued)

OTHER PUBLICATIONS

CATT, "Consideration on Beam Level Measurement Result," 3GPP TSG-RAN WG2 Meeting #106, R2-1905865(Revision of R2-1903161), Reno, Nevada, USA, May 13-17, 2019, 2 pages.
CATT, "Logged MDT in Idle or Inactive mode," 3GPP TSG-RAN WG2 Meeting #107, R2-1908761(Revision of R2-1905867), Prague, Czech Republic, Aug. 26-30, 2019, 6 pages.
Extended European Search Report in European Appln. No. 21746941.0, mailed on Feb. 1, 2024, 11 pages.
(Continued)

*Primary Examiner* — Minh Trang T Nguyen
(74) *Attorney, Agent, or Firm* — Fish & Richardson P.C.

(57) ABSTRACT

A method and apparatus for reporting data transmission procedure failure for network optimization in a wireless communication system is provided. A wireless device performs the data transmissions to a network in idle state and/or inactive state. A wireless device detects failures of the data transmissions. A wireless device logs information related to each of the failures and counts a number of the failures, while the logging validity timer is running. A wireless device establishes or resumes a connection with the network based on that the counted number is equal to or bigger than a threshold value.

15 Claims, 21 Drawing Sheets

(51) Int. Cl.
    *H04W 24/02*     (2009.01)
    *H04W 76/19*     (2018.01)
    *H04W 76/38*     (2018.01)

(56) References Cited

U.S. PATENT DOCUMENTS

| | | |
|---|---|---|
| 10,470,071 B2 | 11/2019 | Tamura et al. |
| 2004/0085894 A1 | 5/2004 | Wang et al. |
| 2012/0108241 A1* | 5/2012 | Wu .............. H04W 24/10 455/436 |
| 2012/0309404 A1 | 12/2012 | Suzuki et al. |
| 2014/0241250 A1 | 8/2014 | Jung et al. |
| 2015/0382218 A1 | 12/2015 | Jung et al. |
| 2017/0034868 A1 | 2/2017 | Chang et al. |
| 2017/0303148 A1 | 10/2017 | Johansson et al. |

OTHER PUBLICATIONS

3GPP TS 36.300 V16.0.0 (Dec. 2019), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," Dec. 2019, 320 pages.

3GPP TS 36.331 V15.8.0 (Dec. 2019), "3rd Generation Partnership Project; Technical Specification Group Radio Access Network; Evolved Universal Terrestrial Radio Access (E-UTRA); Radio Resource Control (RRC); Protocol specification (Release 15)," Dec. 2019, 964 pages.

Huawei et al., "Discussion on RLF report and RACH report for SON," 3GPP TSG-RAN WG2 Meeting #107b, R2-1912756, Chongqing, China, Oct. 14-18, 2019, 3 pages.

Vivo, "Running CR to 38.306 for NR_SON_MDT," 3GPP TSG-RAN2 Meeting #108 R2-1914948, Reno, USA, Nov. 18-22, 2019, 9 pages.

* cited by examiner

METHOD AND APPARATUS FOR REPORTING DATA TRANSMISSION PROCEDURE FAILURE FOR NETWORK OPTIMIZATION IN A WIRELESS COMMUNICATION SYSTEM

CROSS-REFERENCE TO RELATED APPLICATIONS

This application is a National Stage application under 35 U.S.C. § 371 of International Application No. PCT/KR2021/001079, filed on Jan. 27, 2021, which claims the benefit of Korean Patent Application No. 10-2020-0010651, filed on Jan. 29, 2020. The disclosures of the prior applications are hereby incorporated by reference herein in their entirety.

BACKGROUND

Technical Field

The present disclosure relates to a method and apparatus for reporting data transmission procedure failure for network optimization in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In Rel-13, narrowband internet-of-things (NB-IoT) and LTE for machine-type communication (LTE-M) were standardized to provide wide-area connectivity for IoT. The technologies in Rel-14 evolved beyond the basic functionality specified in Rel-13. In Rel-15, to optimize the support for infrequent small data packet transmissions.

For internet-of-things (IOT) user equipment (UE) such as MTC UE and NB-IOT, there are high requirements on the life of battery. Power consumption of wireless device is a key improvement indicator. In the long term evolution (LTE) R-16, one technical requirement is to support uplink transmission in RRC idle mode so that the wireless device could save the power used to enter RRC connected mode.

SUMMARY

Technical Objects

Self-optimization process may use performance measurements to automatically adopt neighbour list optimization, and coverage and capacity control, etc.

For example, the network may send report configuration via RRC dedicated signalling or System Information for the self-optimization process.

If a wireless device has stored measurement result or failure information for report such as RACH report, RLF report, Logged measurement report, and/or Connection establishment fail report, the wireless device may send Report availability in message 5 (Msg5) of a random access process.

If the network requests the report via UL Information Request, the wireless device may transmit the requested report via UL Information Response in a connected mode.

However, if the wireless device does not transit to a connected mode or does not receive the request for report from the network, the wireless device may discard the reports. In this case, the network could not collect the information to be used for network optimization.

Therefore, studies for reporting data transmission procedure failure for network optimization in a wireless communication system are required.

Technical Solutions

In an aspect, a method performed by a wireless device in a wireless communication system is described. A wireless device performs the data transmissions to a network in idle state and/or inactive state. A wireless device detects failures of the data transmissions. A wireless device logs information related to each of the failures and counts a number of the failures, while the logging validity timer is running. A wireless device establishes or resumes a connection with the network based on that the counted number is equal to or bigger than a threshold value.

In another aspect, an apparatus for implementing the above method is provided.

Technical Effects

The present disclosure can have various advantageous effects.

According to some embodiments of the present disclosure, a wireless device could efficiently perform data transmission procedure failure report for network optimization.

For example, if a wireless device suffers from continuous data transmission procedure failures in RRC_IDLE or RRC_INACTIVE, the wireless device could transit to RRC_CONNECTED and send report availability and/or the failure report for network optimization.

For example, by sending data transmission fail information and cell quality information reports, the network could control operations of a wireless device and network resources more efficiently.

For example, the wireless device could save power consumption, since the wireless device may not discard the available report after certain amount of time.

According to some embodiments of the present disclosure, a wireless communication system could efficiently perform network optimization by reporting data transmission procedure failure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
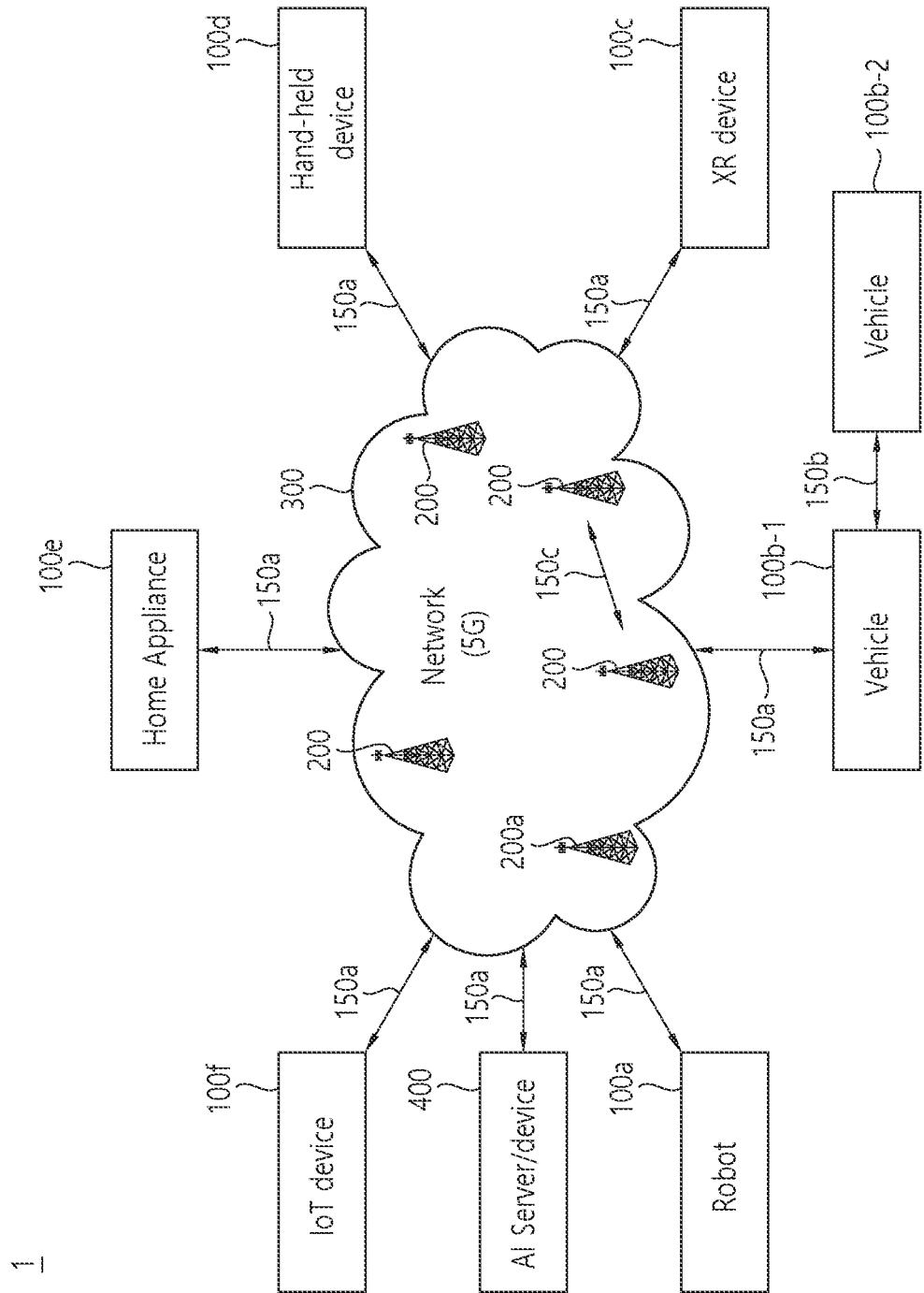
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
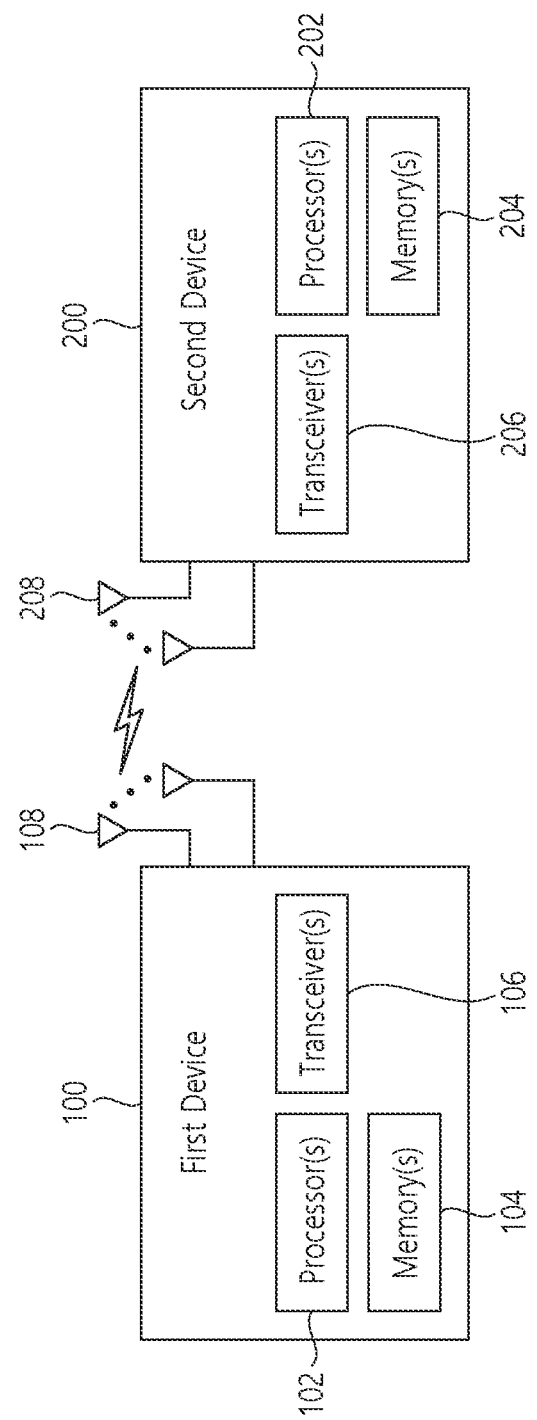
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
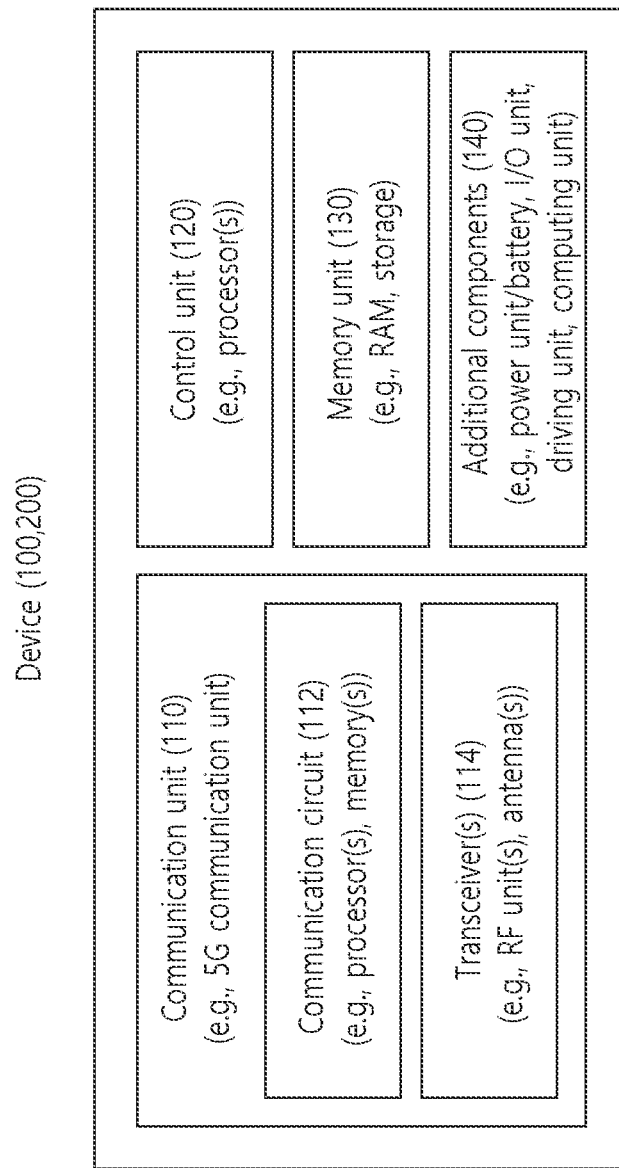
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
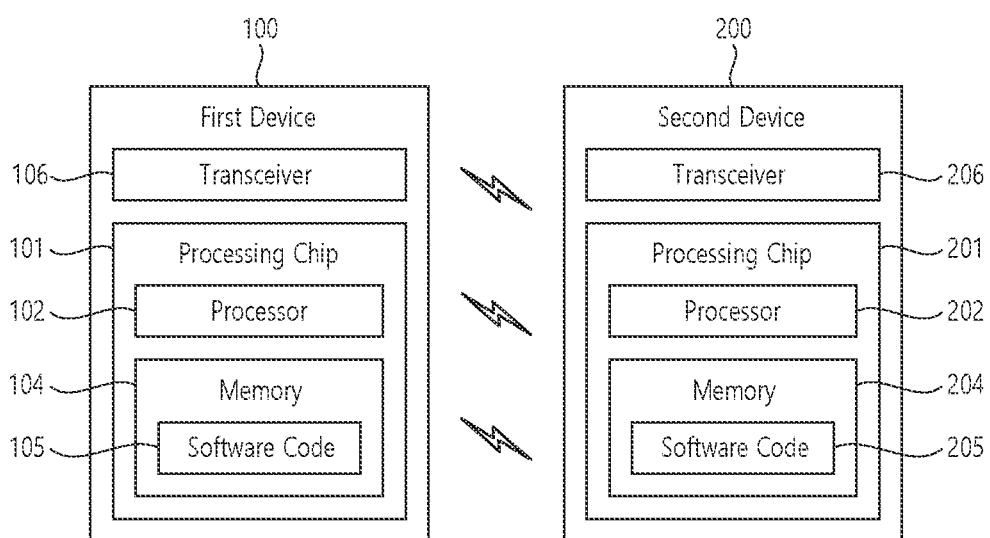
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
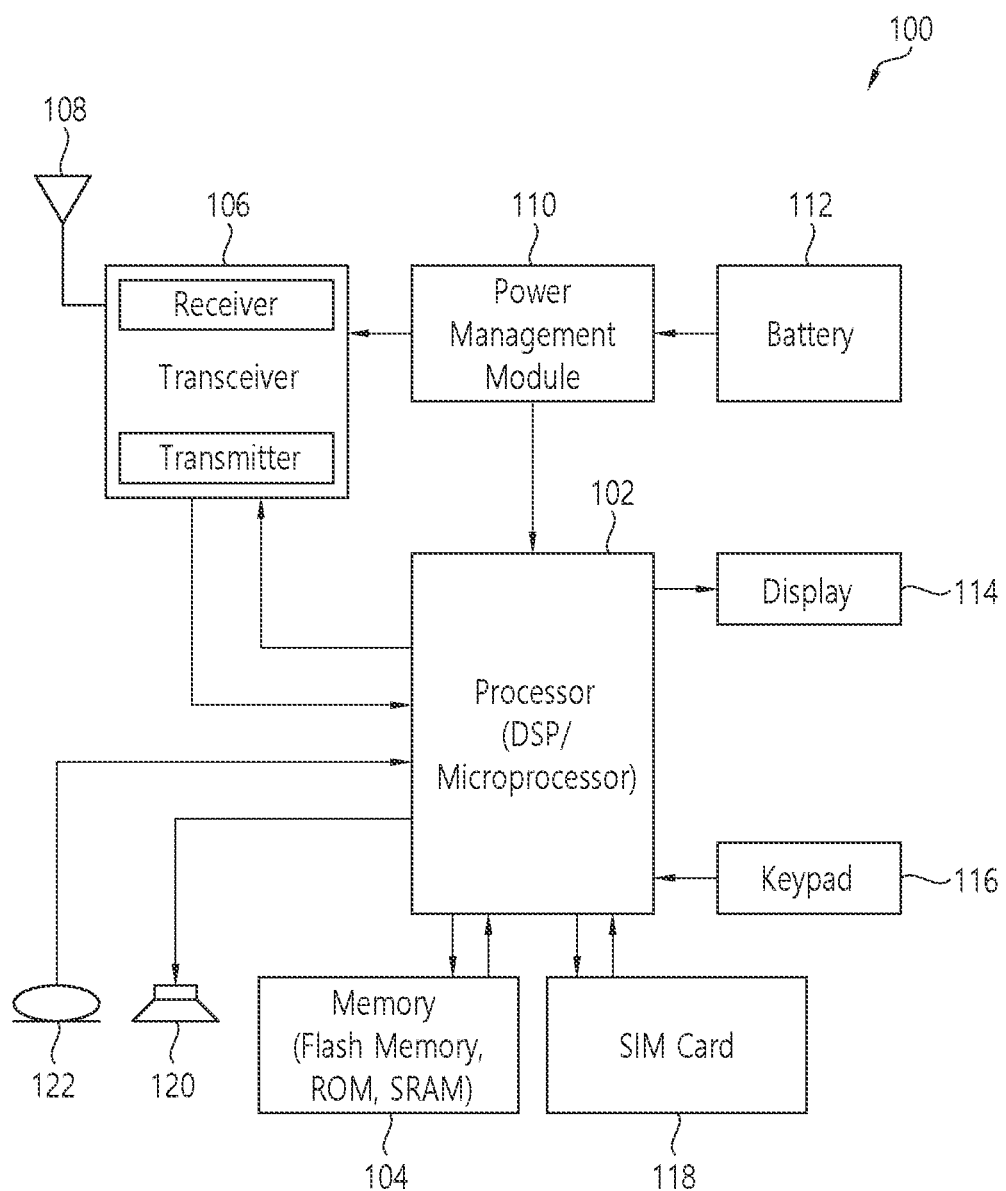
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON' series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
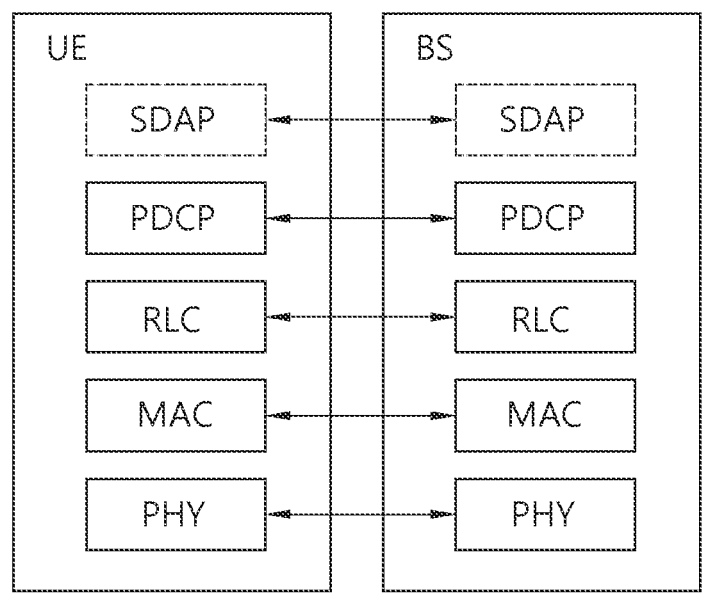
FIGS. 6 and 7 show an example of protocol stacks in a 3GPP based wireless communication system to which implementations of the present disclosure is applied.
Figure 7:
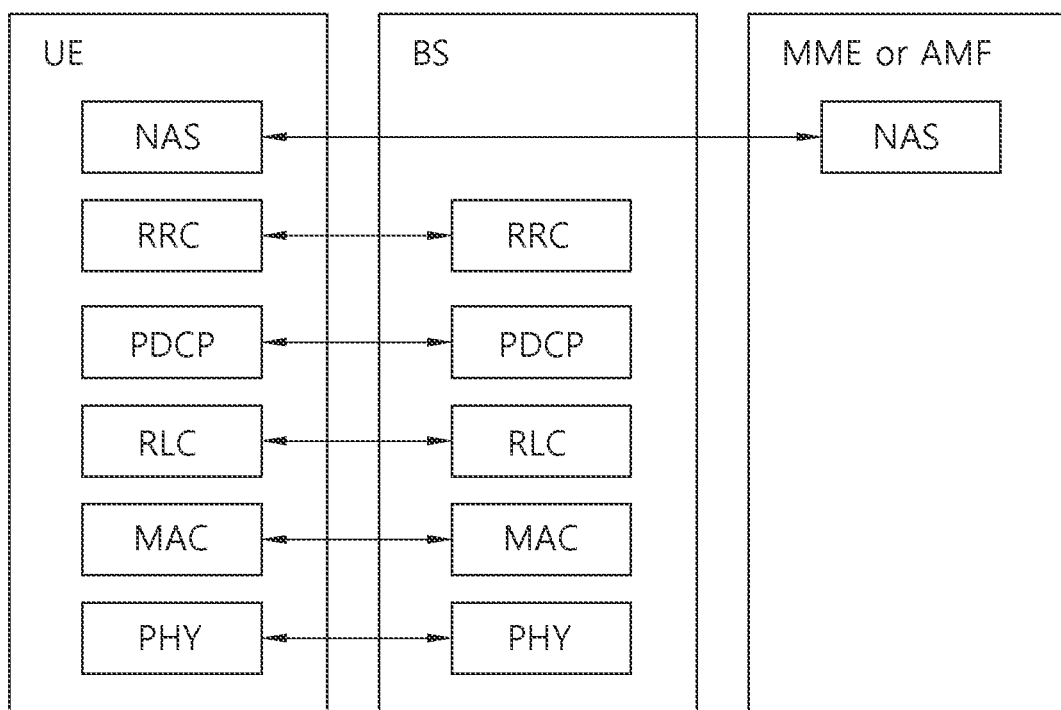

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
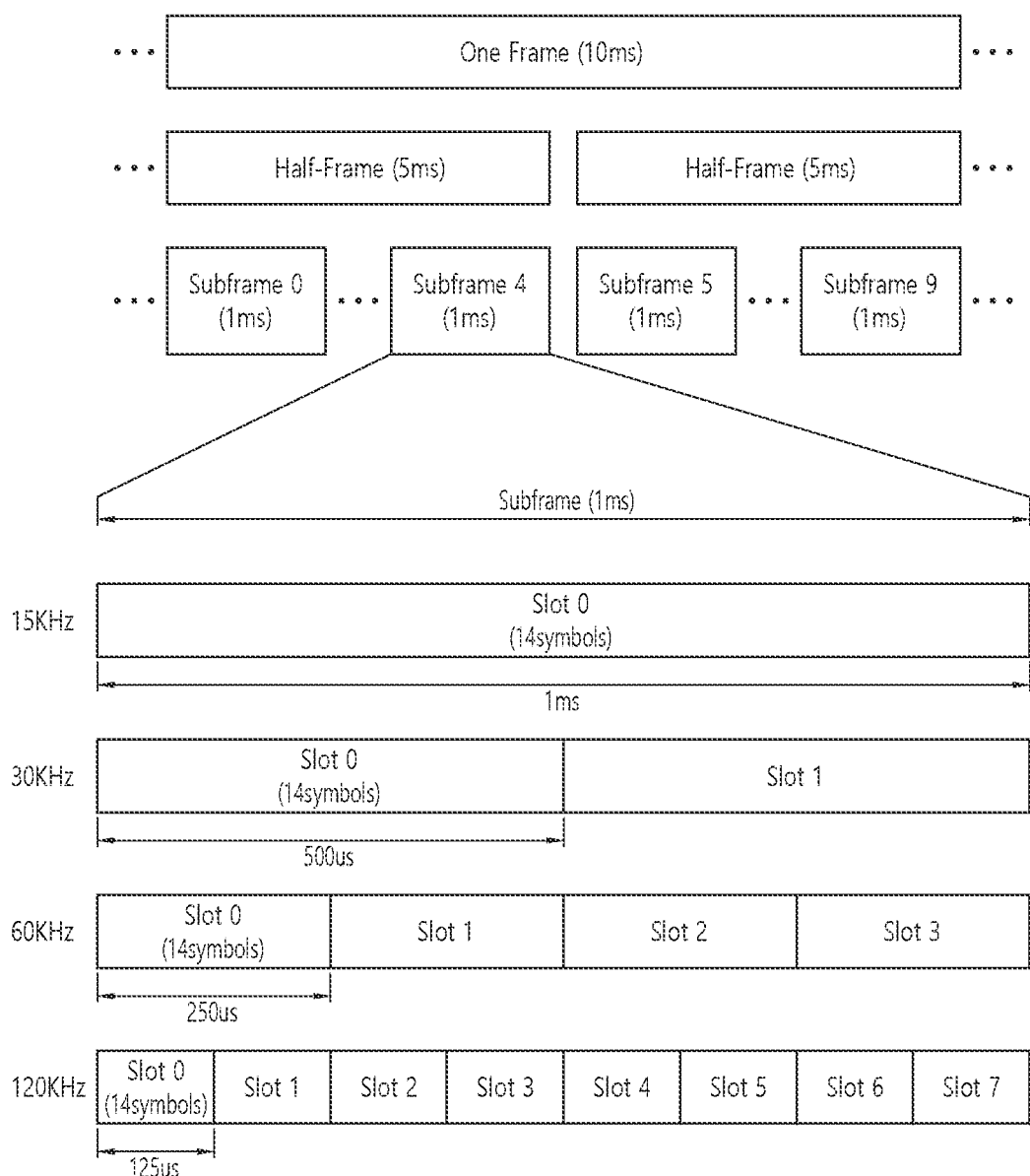
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (S Cells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
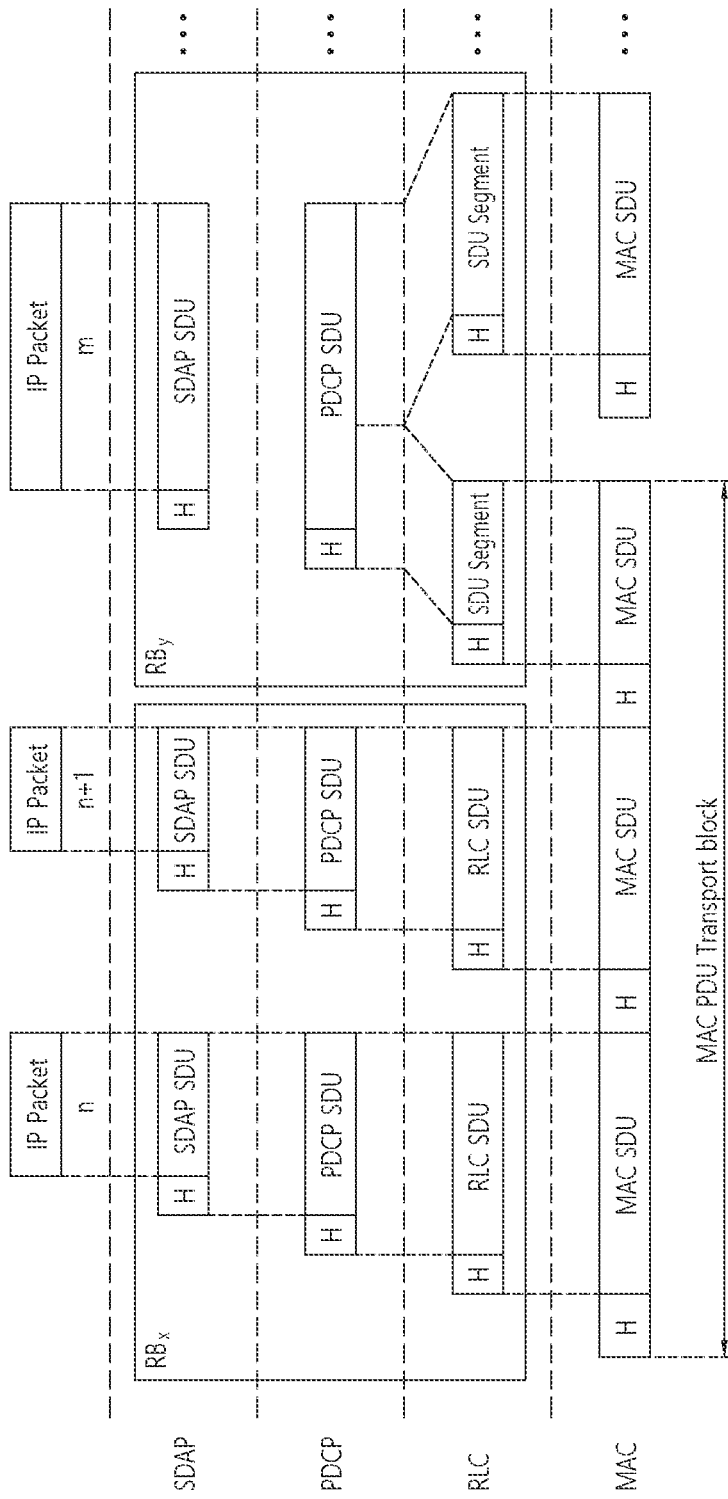
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e., E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

Preconfigured uplink resource (PUR) is designed for NB-IoT and MTC networks in order to save power consumption for data transmission. The network may configure PUR for predictable traffic patterns to a UE in an idle state (e.g., RRC_IDLE) and/or an inactive state (e.g., RRC_INACTIVE). The UE may transmit UL data in RRC_IDLE and/or RRC_INACTIVE without random access procedure and/or state transition to a connected state (e.g., RRC_CONNECTED).

Regarding transmission using PUR, the followings have been agreed.

Transmission in dedicated PUR in RRC_IDLE is supported for UEs with a valid timing advance.

The eNB can (re)configure and release dedicated PUR by dedicated RRC signaling.

Periodic dedicated PUR with duration is supported.

Multi-shot dedicated PUR is supported with the possibility to configure as a single shot.

UE may perform a dedicated PUR request/information, if dedicated PUR is indicated as enabled in the cell.

Network makes the decision on the dedicated PUR configuration.

Request/information can include: Requested transport block size (TBS) and Requested periodicity Dedicated PUR configuration may be released when the eNB doesn't detect "m" consecutive UE transmissions.

The UE must release the dedicated PUR when it does a random access procedure on a new cell.

Dedicated PUR configuration can be set up without a pre-defined end (infinite).

It is possible to configure TBS for dedicated PUR for both NB-IoT and eMTC up to the maximum supported based on the UE category and TBS capability.

For user plane, the UE may transmit dedicated PUR release request/(re)configuration request when transmitting using dedicated PUR.

RRC response message needs to be supported by the UE and could be used in all cases.

For some cases, L1 signaling is sufficient to acknowledge, i.e., RRC response message is not needed.

The L1 signaling for acknowledgement may be sent only after the eNB determines there is no pending DL data or signaling.

The configuration for dedicated PUR provided by RRC signaling may not be updated via L1 signaling.

It is feasible to provide the UE with a UE-specific radio network temporary identifier (RNTI) for dedicated PUR. Common or shared RNTI is also feasible.

The RNTI used for D-PUR is signaled together with other dedicated PUR configuration.

As described below, the current PUR design may always require to monitor PDCCH. When DL information is to be delivered on PDSCH, the UE may first monitor PDCCH to acquire PDSCH scheduling information. Then, the UE may receive the DL information via PDSCH scheduled by the PDCCH.

Figure 10:
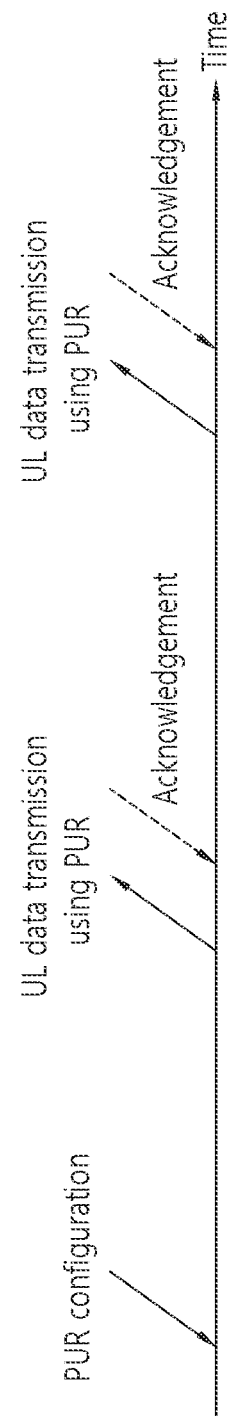
FIG. 10 shows an example of a general procedure for transmission using PUR.

FIG. 10 shows an example of a general procedure for transmission using PUR.

(1) The network configures PUR to the UE.

(2) The UE transmits UL data using PUR in RRC_IDLE and/or RRC_INACTIVE.

(3) The UE receives an acknowledgement for UL data transmission using PUR.

In order to receive the acknowledgement for UL data transmission using PUR, the UE would monitor PDCCH. Then, if further information such as timing advance command (TAC) MAC control element (CE) is to be delivered on PDSCH, the UE may monitor PDSCH using the scheduling information in PDCCH.

Figure 11:
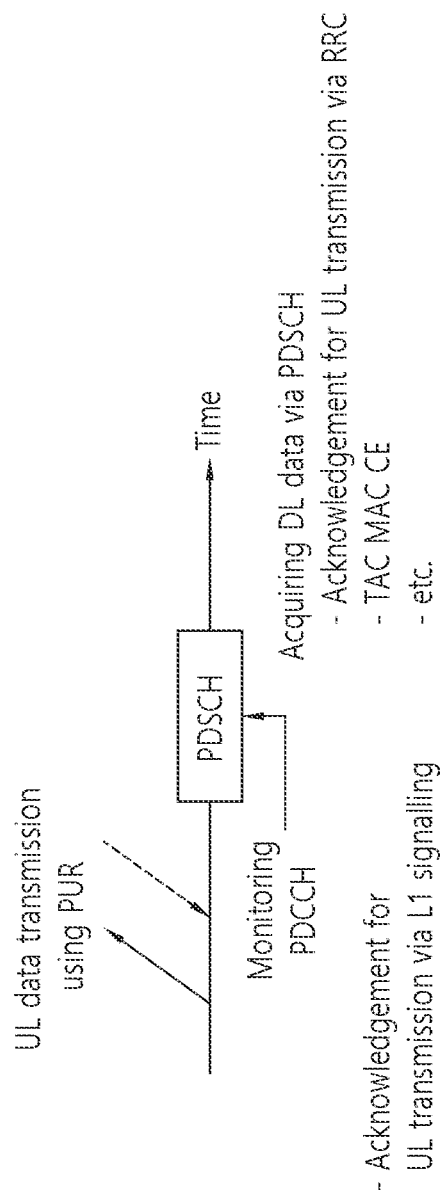
FIG. 11 shows another example of a general procedure for transmission using PUR.

FIG. 11 shows another example of a general procedure for transmission using PUR.
(1) The UE transmits UL data using PUR in RRC_IDLE and/or RRC_INACTIVE.
(2) The UE monitors PDCCH. The PDCCH may carry scheduling information for PDSCH. The PDCCH may carry acknowledgement for UL data transmission using PUR via L1 signaling.
(3) The UE acquires DL data/information on PDSDH which is scheduled by the scheduling information in PDCCH. The DL data/information may include acknowledgement for UL data transmission using PUR via RRC signaling. The DL data/information may further include TAC MAC CE, etc.

In summary, after transmitting UL data using PUR, the UE may determine completion of the UL data transmission based on acknowledgement for UL data transmission using PUR.

The acknowledgement for UL data transmission using PUR may be L1 signaling acknowledgement received via PDCCH. The UE may determine that the UL data transmission using PUR is successful upon receiving the L1 signaling acknowledgement via PDCCH, and the procedure for the UL data transmission using PUR may be considered as completed without monitoring PDSCH.

Alternatively, the acknowledgement for UL data transmission using PUR may be L3 signaling acknowledgement received via PDSCH. The UE may first monitor PDCCH which schedules PDSCH, and may receive the acknowledgement for UL data transmission using PUR via PDSCH. The UE may determine that the UL data transmission using PUR is successful upon receiving the L3 signaling acknowledgement via PDSCH, and the procedure for the UL data transmission using PUR may be considered as completed.

Hereinafter, support for self-configuration and self-optimization is described. Section 22 of 3GPP TS 36.300 v16.0.0 may be referred.

Figure 12:
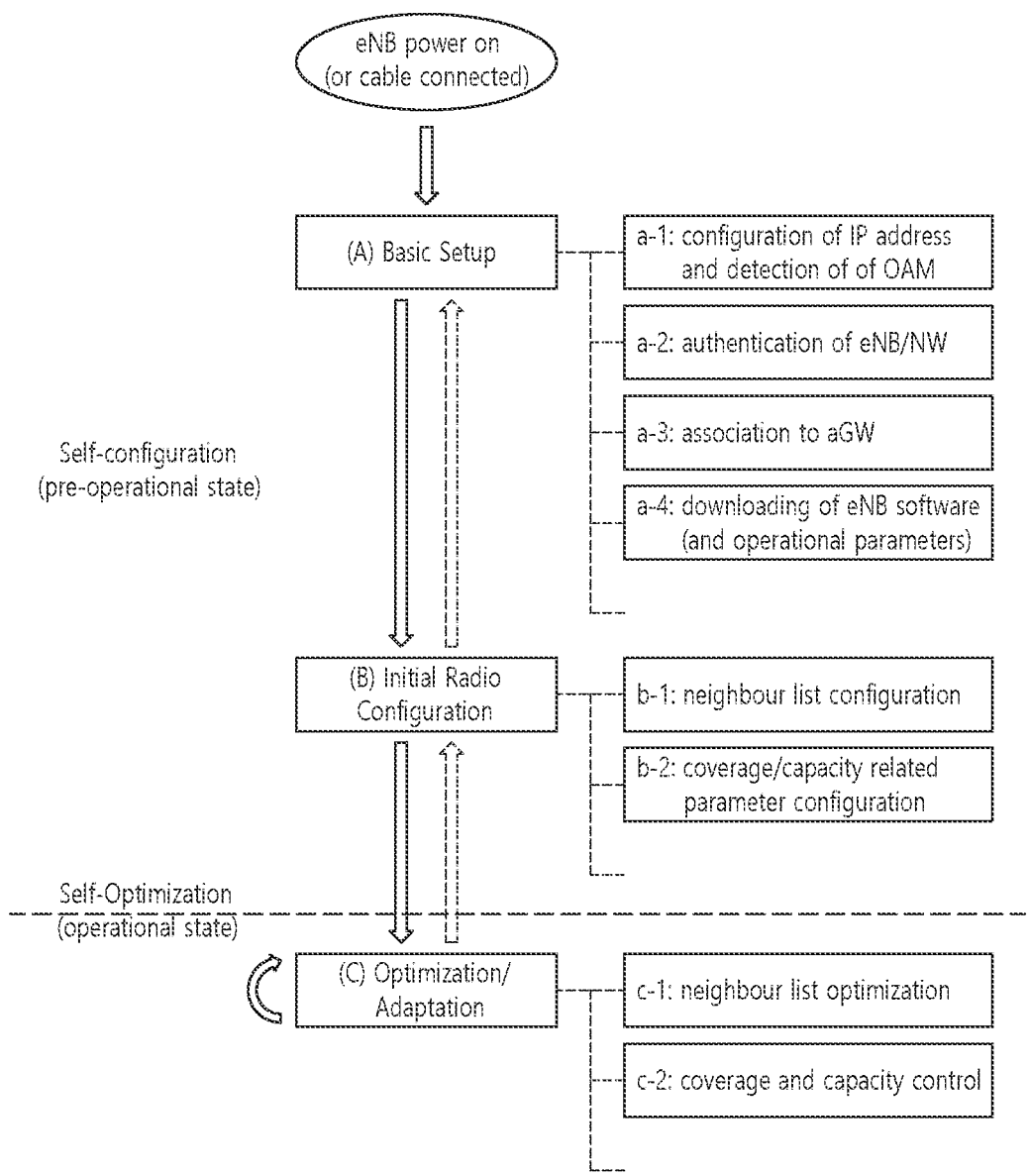
FIG. 12 shows an example of a basic framework for all self-configuration/self-optimization functions to which implementations of the present disclosure is applied.

FIG. 12 shows an example of a basic framework for all self-configuration/self-optimization functions to which implementations of the present disclosure is applied.

This concept includes several different functions from eNB activation to radio parameter tuning.

Self-configuration process is defined as the process where newly deployed nodes are configured by automatic installation procedures to get the necessary basic configuration for system operation.

This process works in pre-operational state. Pre-operational state is understood as the state from when the eNB is powered up and has backbone connectivity until the RF transmitter is switched on.

As described in FIG. 12, functions handled in the pre-operational state like:
Basic Setup; and
Initial Radio Configuration.
are covered by the Self Configuration process.

Self-optimization process is defined as the process where UE & eNB measurements and performance measurements are used to auto-tune the network.

This process works in operational state. Operational state is understood as the state where the RF interface is additionally switched on.

As described in FIG. 12, functions handled in the operational state like:
Optimization/Adaptation
are covered by the Self Optimization process.

UE may support for self-configuration and self-optimisation.

UE shall support measurements and procedures which can be used for self-configuration and self-optimisation of the E-UTRAN system.

UE shall support measurements and measurement reporting to support self-optimisation of the E-UTRAN system. Measurements and reports used for the normal system operation, should be used as input for the self-optimisation process as far as possible.

The network is able to configure the measurements and the reporting for self-optimisation support by RRC signalling messages.

Support for Mobility Load Balancing is described.

The objective of load balancing is to distribute cell load evenly among cells or to transfer part of the traffic from congested cells. This is done by the means of self-optimisation of mobility parameters or handover actions.

Self-optimisation of the intra-LTE and inter-RAT mobility parameters to the current load in the cell and in the adjacent cells can improve the system capacity compared to static/non-optimised cell reselection/handover parameters. Such optimisation can also minimize human intervention in the network management and optimization tasks.

Support for mobility load balancing consists of one or more of following functions:
Load reporting;
Load balancing action based on handovers;
Adapting handover and/or reselection configuration.

Triggering of each of these functions is optional and depends on implementation.

Figure 13:
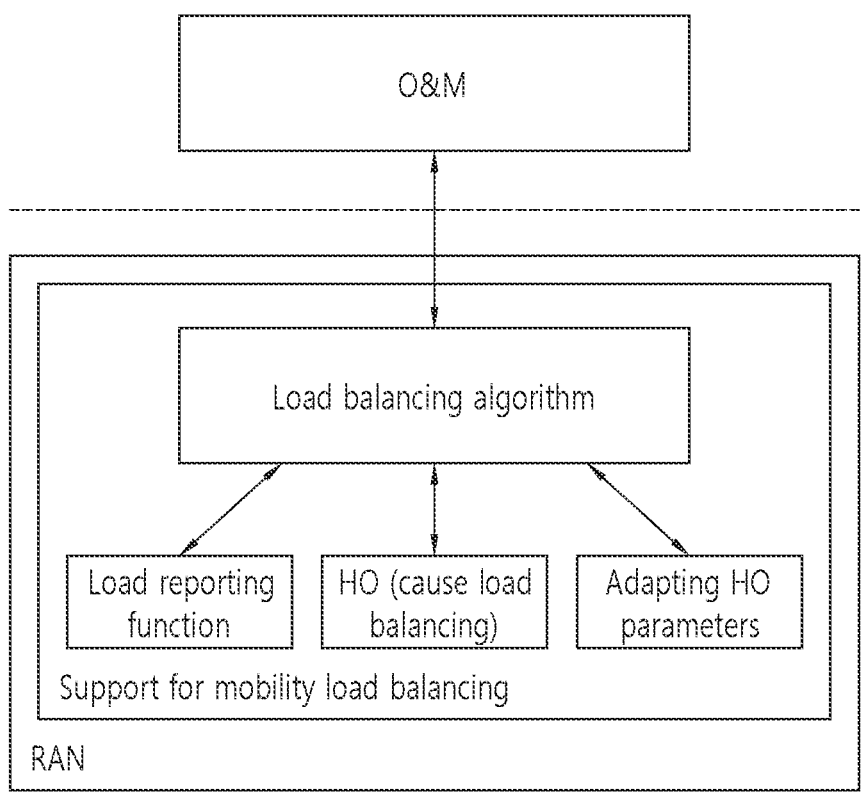
FIG. 13 shows an example of a functional architecture to which implementations of the present disclosure is applied.

FIG. 13 shows an example of a functional architecture to which implementations of the present disclosure is applied.

Load reporting is described.

The load reporting function is executed by exchanging cell specific load information between neighbour eNBs over the X2 interface (intra-LTE scenario) or S1 (inter-RAT scenario).

Load reporting for intra-LTE scenario is described.

The load information consists of:
radio resource usage (UL/DL GBR PRB usage, UL/DL non-GBR PRB usage, UL/DL total PRB usage);
HW load indicator (UL/DL HW load: low, mid, high, overload);
TNL load indicator (UL/DL TNL load: low, mid, high, overload);
(Optionally) Cell Capacity Class value (UL/DL relative capacity indicator: the same scale shall apply to E-UTRAN, UTRAN and GERAN cells when mapping cell capacities on this value);
Capacity value (UL/DL available capacity for load balancing as percentage of total cell capacity).

Capacity value is expressed in available E-UTRAN resources.

A cell is expected to accept traffic corresponding to the indicated available capacity.

Load reporting for inter-RAT scenario is described.

The load information consists of:
Cell Capacity Class value (UL/DL relative capacity indicator: the same scale shall apply to E-UTRAN, UTRAN, GERAN and eHRPD cells when mapping cell capacities on this value);
Capacity value (UL/DL available capacity for load balancing as percentage of total cell capacity).

Capacity value is expressed in available E-UTRAN resources.

A cell is expected to accept traffic corresponding to the indicated available capacity.

Event-triggered inter-RAT load reports are sent when the reporting node detects crossing of cell load thresholds.

Load information shall be provided in a procedure separated from existing active mode mobility procedures, which shall be used infrequently and with lower priority with respect to the UE dedicated signalling.

Load balancing action based on handovers is described.

The source cell may initiate handover due to load. The target cell performs admission control for the load balancing handovers. A handover preparation related to a mobility load balancing action shall be distinguishable from other handovers, so that the target cell is able to apply appropriate admission control.

Adapting handover and/or reselection configuration is described.

This function enables requesting of a change of handover and/or reselection parameters at target cell. The source cell that initialized the load balancing estimates if it is needed to change mobility configuration in the source and/or target cell. If the amendment is needed, the source cell initializes mobility negotiation procedure toward the target cell.

The source cell informs the target cell about the new mobility setting and provides cause for the change (e.g. load balancing related request). The proposed change is expressed by the means of the difference (delta) between the current and the new values of the handover trigger. The handover trigger is the cell specific offset that corresponds to the threshold at which a cell initialises the handover preparation procedure. Cell reselection configuration may be amended to reflect changes in the HO setting. The target cell responds to the information from the source cell. The allowed delta range for HO trigger parameter may be carried in the failure response message. The source cell should consider the responses before executing the planned change of its mobility setting.

All automatic changes on the HO and/or reselection parameters must be within the range allowed by OAM.

Support for Mobility Robustness Optimisation is described.

Mobility Robustness Optimisation aims at detecting and enabling correction of following problems:
Connection failure due to intra-LTE or inter-RAT mobility;
Unnecessary HO to another RAT (too early IRAT HO with no radio link failure);
Inter-RAT ping-pong.

Radio Link Failure report is described.

The RLF Report from the UE can be used for both coverage optimization and mobility robustness optimization.

The UE stores the latest RLF or handover failure related information, and indicates RLF report availability at each subsequent LTE RRC connection (re-)establishment and handover to an LTE cell until the RLF report is fetched by the network or for 48 hours after the RLF or handover failure is detected.

The UE keeps the information during state transitions and RAT changes, and indicates RLF report availability again after it returns to the LTE RAT.

The UE only indicates RLF report availability and only provides the RLF report to the network if the current RPLMN is a PLMN that was present in the UE's EPLMN List or was the RPLMN at the time the RLF or handover failure was detected.

Logged Measurement Configuration is described. Section 5.6 of 3GPP TS 36.331 v15.8.0 may be referred.

The purpose of this procedure is to configure the UE to perform logging of measurement results while in RRC_IDLE and to perform logging of measurement results for MBSFN in both RRC_IDLE and RRC_CONNECTED. The procedure applies to logged measurements capable UEs that are in RRC_CONNECTED.

E-UTRAN may retrieve stored logged measurement information by means of the UE information procedure.

E-UTRAN initiates the logged measurement configuration procedure to UE in RRC_CONNECTED by sending the LoggedMeasurementConfiguration message.

Reception of the LoggedMeasurementConfiguration by the UE is described.

Upon receiving the LoggedMeasurementConfiguration message the UE shall:
1> discard the logged measurement configuration as well as the logged measurement information;
1> store the received loggingDuration, loggingInterval and areaConfiguration, if included, in VarLogMeasConfig;
1> if the LoggedMeasurementConfiguration message includes plmn-IdentityList:
2> set plmn-IdentityList in VarLogMeasReport to include the RPLMN as well as the PLMNs included in plmn-IdentityList;
1> else:
2> set plmn-IdentityList in VarLogMeasReport to include the RPLMN;
1> store the received absoluteTimeInfo, traceReference, traceRecordingSessionRef and tce-Id in VarLogMeasReport;
1> store the received targetMBSFN-AreaList, if included, in VarLogMeasConfig;
1> store the received bt-NameList, if included, in VarLogMeasConfig;
1> store the received wlan-Namelist, if included, in VarLogMeasConfig;
1> start timer T330 with the timer value set to the loggingDuration;

Upon expiry of T330 the UE shall:
1> release VarLogMeasConfig;

The UE is allowed to discard stored logged measurements, i.e. to release VarLogMeasReport, 48 hours after T330 expiry.

Release of Logged Measurement Configuration is described.

The purpose of this procedure is to release the logged measurement configuration as well as the logged measurement information.

The UE shall initiate the procedure upon receiving a logged measurement configuration in another RAT. The UE shall also initiate the procedure upon power off or detach.

The UE shall:
1> stop timer T330, if running;
1> if stored, discard the logged measurement configuration as well as the logged measurement information, i.e. release the UE variables VarLogMeasConfig and VarLogMeasReport;

Measurements logging is described.

This procedure specifies the logging of available measurements by a UE in RRC_IDLE that has a logged measurement configuration and the logging of available measurements by a UE in both RRC_IDLE and RRC_CONNECTED if targetMBSFN-AreaList is included in VarLogMeasConfig.

While T330 is running, the UE shall:
1> if measurement logging is suspended:
2> if during the last logging interval the IDC problems detected by the UE is resolved, resume measurement logging;
1> if not suspended, perform the logging in accordance with the following:
2> if targetMBSFN-AreaList is included in VarLogMeasConfig:
3> if the UE is camping normally on an E-UTRA cell or is connected to E-UTRA; and
3> if the RPLMN is included in plmn-IdentityList stored in VarLogMeasReport; and
3> if the PCell (in RRC_CONNECTED) or cell where the UE is camping (in RRC_IDLE) is part of the area indicated by areaConfiguration if configured in VarLogMeasConfig:
4> for MBSFN areas, indicated in targetMBSFN-AreaList, from which the UE is receiving MBMS service:
5> perform MBSFN measurements in accordance with the performance requirements;
When configured to perform MBSFN measurement logging by targetMBSFN-AreaList, the UE is not required to receive additional MBSFN subframes, i.e. logging is based on the subframes corresponding to the MBMS services the UE is receiving.
5> perform logging at regular time intervals as defined by the loggingInterval in VarLogMeasConfig, but only for those intervals for which MBSFN measurement results are available;
2> else if:
3> if the UE is in any cell selection state:
4> perform the logging at regular time intervals, as defined by the loggingInterval in VarLogMeasConfig;
3> else if the UE is camping normally on an E-UTRA cell and if the RPLMN is included in plmn-IdentityList stored in VarLogMeasReport and, if the cell is part of the area indicated by areaConfiguration if configured in VarLogMeasConfig:
4> perform the logging at regular time intervals, as defined by the loggingInterval in VarLogMeasConfig;
2> when adding a logged measurement entry in VarLogMeasReport, include the fields in accordance with the following:
3> if the UE detected IDC problems during the last logging interval:
4> if measResultServCell in VarLogMeasReport is not empty:
5> include InDeviceCoexDetected;
5> suspend measurement logging from the next logging interval;
4> else:
5> suspend measurement logging;
The UE may detect the start of IDC problems as early as Phase 1.
3> set the relativeTimeStamp to indicate the elapsed time since the moment at which the logged measurement configuration was received;
3> if detailed location information became available during the last logging interval, set the content of the locationInfo as follows:
4> include the locationCoordinates;
3> if wlan-NameList is included in VarLogMeasConfig:
4> if detailed WLAN measurements are available:
5> include logMeasResultListWLAN, in order of decreasing RSSI for WLAN APs;
3> if bt-NameList is included in VarLogMeasConfig:
4> if detailed Bluetooth measurements are available:
5> include logMeasResultListBT, in order of decreasing RSSI for Bluetooth beacons;
3> if targetMBSFN-AreaList is included in VarLogMeasConfig:
4> for each MBSFN area, for which the mandatory measurements result fields became available during the last logging interval:
5> set the rsrpResultMBSFN, rsrqResultMBSFN to include measurement results that became available during the last logging interval;
5> include the fields signallingBLER-Result or dataBLER-MCH-ResultList if the concerned BLER results are available,
5> set the mbsfn-AreaId and carrierFrequency to indicate the MBSFN area in which the UE is receiving MBSFN transmission;
4> if in RRC_CONNECTED:
5> set the servCellIdentity to indicate global cell identity of the PCell;
5> set the measResultServCell to include the layer 3 filtered measured results of the PCell;
5> if available, set the measResultNeighCells to include the layer 3 filtered measured results of SCell(s) and neighbouring cell(s) measurements that became available during the last logging interval, in order of decreasing RSRP, for at most the following number of cells: 6 intra-frequency and 3 inter-frequency cells per frequency and according to the following:
6> for each cell included, include the optional fields that are available;
5> if available, optionally set the measResultNeighCells to include the layer 3 filtered measured results of neighbouring cell(s) measurements that became available during the last logging interval, in order of decreasing RSCP(UTRA)/RSSI(GERAN)/Pilot-Strength(cdma2000), for at most the following number of cells: 3 inter-RAT cells per frequency (UTRA, cdma2000)/set of frequencies (GERAN), and according to the following:
6> for each cell included, include the optional fields that are available;
4> if in RRC_IDLE:
5> set the servCellIdentity to indicate global cell identity of the serving cell;
5> set the measResultServCell to include the quantities of the serving cell;
5> if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency and according to the following:
6> for each neighbor cell included, include the optional fields that are available;
5> if available, optionally set the measResultNeighCells, in order of decreasing ranking-criterion as used for cell re-selection, to include neighbouring cell measurements that became available during the last logging interval, for at most the following number of cells: 3 inter-RAT cells per frequency (UTRA, cdma2000)/set of frequencies (GERAN), and according to the following:
6> for each cell included, include the optional fields that are available;

4> for the cells included according to the previous (i.e. covering previous and current serving cells as well as neighbouring EUTRA cells) include results according to the extended RSRQ if corresponding results are available according to the associated performance requirements;

4> for the cells included according to the previous (i.e. covering previous and current serving cells as well as neighbouring EUTRA cells) include RSRQ type if the result was based on measurements using a wider band or using all OFDM symbols;

The UE includes the latest results in accordance with the performance requirements. E.g. RSRP and RSRQ results are available only if the UE has a sufficient number of results/receives a sufficient number of subframes during the logging interval.

3> else:
4> if the UE is in any cell selection state:
5> set anyCellSelectionDetected to indicate the detection of no suitable or no acceptable cell found;
5> set the servCellIdentity to indicate global cell identity of the last logged cell that the UE was camping on;
5> set the measResultServCell to include the quantities of the last logged cell the UE was camping on;
4> else:
5> set the servCellIdentity to indicate global cell identity of the cell the UE is camping on;
5> set the measResultServCell to include the quantities of the cell the UE is camping on;
4> if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies (GERAN) per RAT and according to the following:
5> for each neighbour cell included, include the optional fields that are available;
4> for the cells included according to the previous (i.e. covering previous and current serving cells as well as neighbouring EUTRA cells) include results according to the extended RSRQ if corresponding results are available according to the associated performance requirements;
4> for the cells included according to the previous (i.e. covering previous and current serving cells as well as neighbouring EUTRA cells) include RSRQ type if the result was based on measurements using a wider band or using all OFDM symbols;

The UE includes the latest results of the available measurements as used for cell reselection evaluation in RRC_IDLE or as used for evaluation of reporting criteria or for measurement reporting in RRC_CONNECTED, which are performed in accordance with the performance requirements.

2> when the memory reserved for the logged measurement information becomes full, stop timer T330 and perform the same actions;

Timer T330 is described.

T330 may start upon receiving LoggedMeasurementConfiguration message.

T330 may stop upon log volume exceeding the suitable UE memory, upon initiating the release of LoggedMeasurementConfiguration procedure.

Meanwhile, self-optimisation process may use performance measurements to automatically adopt neighbour list optimisation, and coverage and capacity control, etc.

For example, the network may send report configuration via RRC dedicated signalling or System Information. If a wireless device has stored measurement result or failure information for report such as RACH report, RLF report, Logged measurement report, and Connection establishment fail report, the wireless device may send Report availability in Msg5. If the network requests the report via ULInformationRequest, the wireless device may transmit the requested report via ULInformationResponse in a connected mode.

However, if the wireless device does not transit to a connected mode or does not receive the request for report from the network, the wireless device may discard the reports.

For example, the wireless device, staying in the idle or inactive mode more than 48 hours after measurement or failure detection (in some case 48 hours after T330 expiry) without the connected mode transition, may discard the stored measurement result or failure information, and the network cannot collect the information.

As the design of data transmission during an idle or inactive mode is aimed at reducing connected mode state transition, the wireless device may not have chance to inform Report availability to the network, if the purpose of UE operation is data transmission in RRC_IDLE or RRC_INACTIVE, since currently the report availability is informed to the network in Msg5. Then, the network could not collect necessary information for the network optimisation on time.

Depending on the types of user data, some IoT devices would not fall back to a legacy data transmission mechanism in a connected mode and keep attempting to transmit data in RRC_IDLE or RRC_INACTIVE although data transmission has failed.

Then, the wireless device would not have chance to inform Report availability to the network although the wireless device has RACH report or the serving cell's idle mode measurement results, and the network cannot collect the UE's information to be used for network optimisation.

In addition, this may cause more power consumption from the wireless device, especially when the network configures preconfigured resources to the network. If the network could acquire performance measurement of the wireless device after a certain number of failures and detect any problem in the radio environment, the network may reconfigure the wireless device (for example, release of radio connection as well as radio resources).

Therefore, studies for reporting data transmission procedure failure for network optimization in a wireless communication system are required.

Hereinafter, a method for reporting data transmission procedure failure for network optimization in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 14:
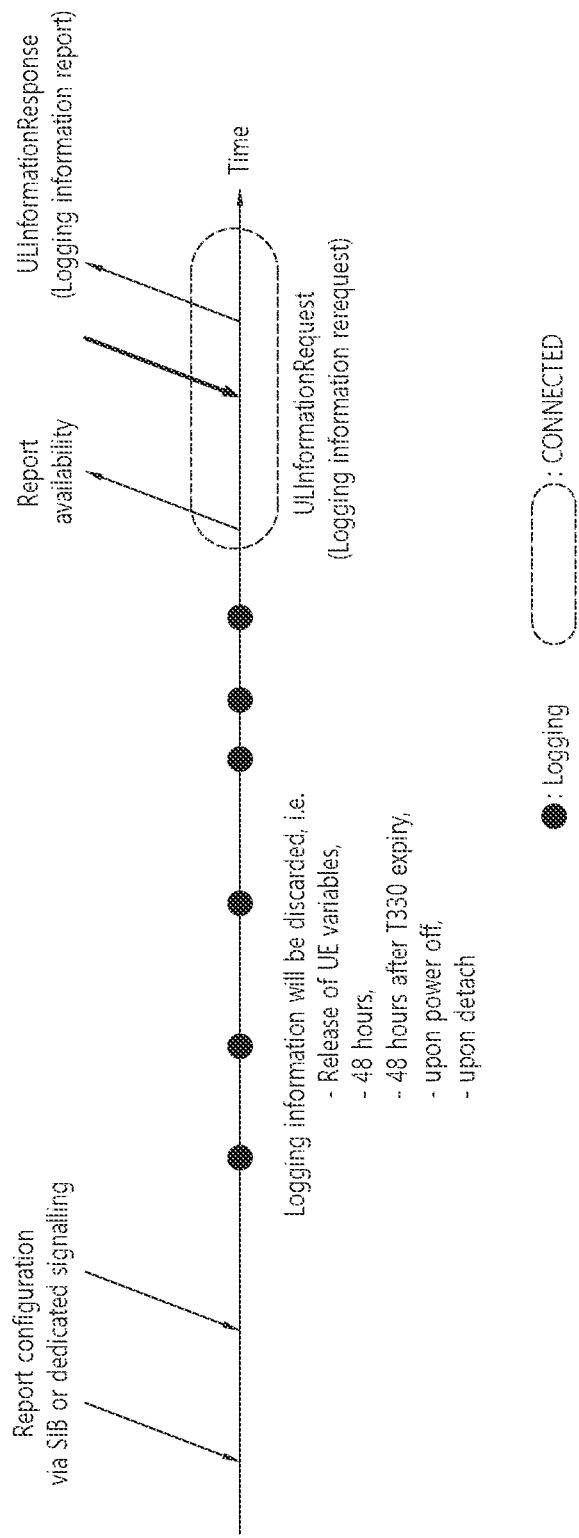
FIG. 14 shows an example of a procedure for logging information to which implementations of the present disclosure is applied.

FIG. 14 shows an example of a procedure for logging information to which implementations of the present disclosure is applied.

In FIG. 14, the network may send report configuration via RRC dedicated signalling (for example, LoggedMeasurementConfiguration) or System Information (for example, servingCellMeasInfo in SIB2-NB).

If a UE has stored measurement result or failure information for report such as RACH report, RLF report, Logged measurement report and Connection establishment fail report, the UE may send Report availability in Msg5 (for example, RRC setup complete, RRC reconfiguration complete, RRC resume complete, RRC reestablishment complete).

If the network requests the report via ULInformationRequest, the UE may transmit the requested report via ULInformationResponse in a connected mode.

For example, logging information may be discarded in several cases for saving resources. For example, the UE may discard the reports upon release of the UE variables for report (for example, VarLogMeasReport), 48 hours after the failure is detected, 48 hours after T330 expiry, upon power off or upon detach.

Figure 15:
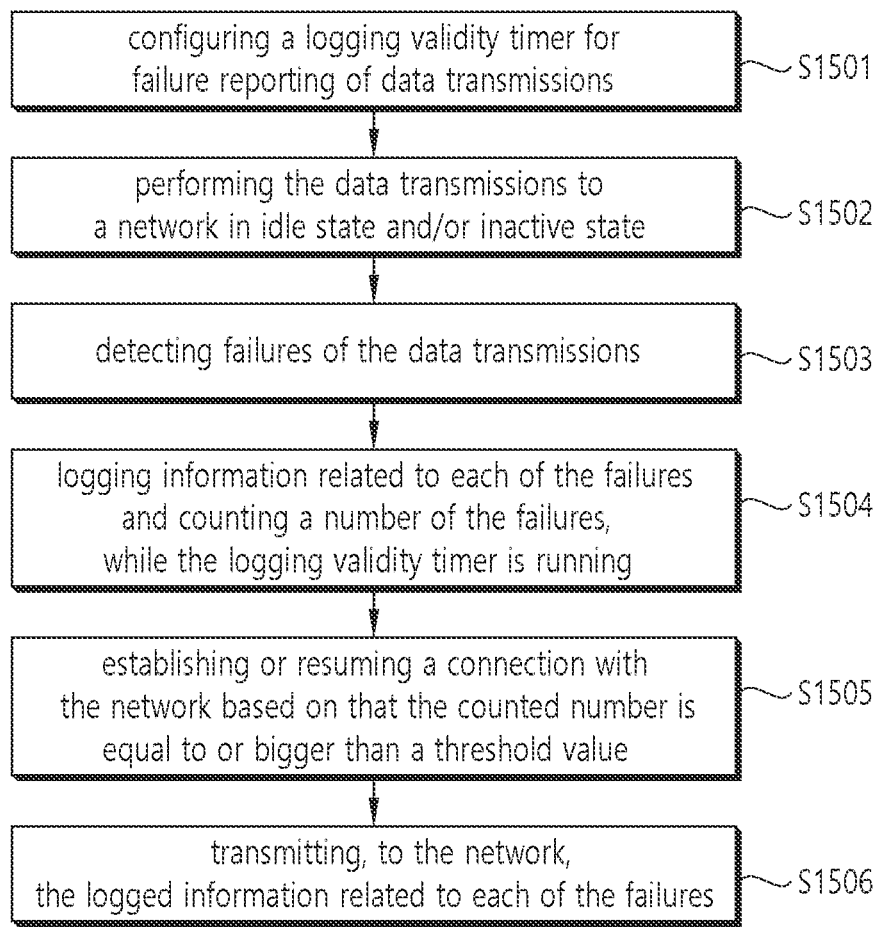
FIG. 15 shows an example of a method for reporting data transmission procedure failure for network optimization in a wireless communication system, according to some embodiments of the present disclosure.

FIG. 15 shows an example of a method for reporting data transmission procedure failure for network optimization in a wireless communication system, according to some embodiments of the present disclosure.

In particular, FIG. 15 shows an example of a method performed by a wireless device.

In step S1501, a wireless device may configure a logging validity timer for failure reporting of data transmissions.

For example, a wireless device may receive, from a network, a report configuration including a configuration for the logging validity timer. For example, the report configuration may be transmitted via broadcast and/or dedicated signalling. For example, the report configuration could be delivered via L1, L2 and/or L3 signalling. For other example, the report configuration may be preconfigured by the wireless device.

For example, the report configuration may configure the wireless device to report information (for example, data transmission failure information, information on signal quality for serving cell and/or neighbor cells, RACH failure information) stored while in an idle state and/or an inactive state.

According to some embodiments of the present disclosure, a wireless device may start the logging validity timer upon entering into the idle state and/or the inactive state.

According to some embodiments of the present disclosure, a wireless device may start the logging validity timer upon receiving a report configuration for the logged information from the network.

According to some embodiments of the present disclosure, a wireless device may start the logging validity timer upon detecting a first failure, among the failures, of the data transmission procedure.

For example, a value for the logging validity timer may be a preconfigured by the wireless device.

For example, a value for the logging validity timer may be a configured via broadcast or dedicated signalling by the network.

For example, a value for the logging validity timer is a fixed value (for example, 48 hours).

In step S1502, a wireless device may performing the data transmissions to a network in idle state and/or inactive state.

In step S1503, a wireless device may detect failures of the data transmissions.

For example, the wireless device may attempt uplink data transmission and/or paging response for mobile-terminated data transmission. If failure for the uplink data transmission and/or paging response is detected, the wireless device may store at least one of variables for report (for example, VarDataTransFailureReport).

In step S1504, a wireless device may log information related to each of the failures and count a number of the failures, while the logging validity timer is running.

For example, the wireless device may store detailed data transmission information such as type of data transmission and failure cause without network configuration.

According to some embodiments of the present disclosure, the wireless device may log information related to each of the failures, whenever the wireless device detects the failures.

For example, the logged information related to the each of the failures may include at least one of (1) information on whether grant for the data transmissions is received, (2) information on coverage level (for example, CE level, CE mode) when data transmission has failed, (3) information on whether positive acknowledgement (ACK) is received, (4) information on whether a negative acknowledgement (NACK) is received, (5) information on each type of the data transmissions (for example, EDT, PUR, 2-step RA, 4-step RA, Msg2 based downlink data transmission, Msg4 based downlink data transmission), (6) information on connection state of the wireless device (for example, RRC_IDLE, RRC_INACTIVE), (7) information on power level (for example, maxTxPowerReached, power level when failure is detected), (8) information on failure condition (for example, failure case such as no ACK, no grant), (9) time information (for example, that the failure is detected, that the time elapsed after the first failure is detected), and/or (10) type of core network that the failure is detected (for example, EPS, 5GC).

According to some embodiments of the present disclosure, a wireless device, while in the idle state and/or the inactive state, may store at least one of (1) information on signal quality for serving cell and/or neighbor cells which are measured in the idle state and/or the inactive state, and/or (2) information on random access failures before establishing or resuming the connection with the network.

For example, the information on the signal quality for serving cell and/or neighbor cells information may be measured and stored while in the idle state and/or the inactive state For example, the information on the signal quality for serving cell and/or neighbor cells information may include at least one of (i) measurement results of serving cell and/or neighbor cells (for example, measResultList, measResultNeighCells), (ii) Reference Signal Received Power (RSRP), Reference Signal Received Quality (RSRQ), and/or Channel Quality Indictor (CQI) information (for example, rsrq-Range, rsrq-Type, cqi-report, measResultFailedCell), (iii) cell information (for example, one or more cell identities that failure is detected, (iv) WLAN measurement results, (v) Bluetooth measurement results, and/or (vi) satellite communication measurement results.

For example, a wireless device may log information on the random access failures before establishing or resuming the connection with the network, in step S1505 below.

For example, information on the random access failures may include at least one of (1) number of preambles sent, and/or (2) whether a contention is detected.

According to some embodiments of the present disclosure, a wireless device may configure a threshold for the failure count.

For example, the threshold for the failure count may be included in the report configuration. For example, a wireless device may configure the threshold value for the failure count by itself.

According to some embodiments of the present disclosure, a wireless device may configure different counter for different type of data transmission. In this case, a wireless device may increment only a specific counter upon detecting failures on a specific type of data transmission.

According to some embodiments of the present disclosure, a wireless device may configure different counter and different logging validity timer for different type of data transmission.

For example, a wireless device may check whether a specific counter, for a specific type of data transmission, is equal to or bigger than a threshold value, for the specific type of data transmission, while a specific timer, for the specific type of data transmission, is running.

For example, the network may configure more than one threshold to identify report condition. For example, the network may configure a threshold for RACHless data transmission and another threshold for RACH based data transmission. For example, the network may configure a separate threshold for satellite based data transmission.

According to some embodiments of the present disclosure, if mobile-originated and/or mobile-terminated data transmission procedure is failed, the wireless device may count the attempts. The wireless device may increment a value for a counter whenever the transmission fails.

For example, the wireless device may maintain a counter for mobile-originated RACHless and RACH-based data transmission failures, respectively.

For other example, the wireless device may maintain a counter only for mobile-originated RACHless data transmission.

In step S1505, a wireless device may establish or resume a connection with the network based on that the counted number is equal to or bigger than a threshold value.

According to some embodiments of the present disclosure, a wireless device may establish or resume the connection with the network, based on that the counted number reaches the threshold value before expiry of the logging validity timer.

According to some embodiments of the present disclosure, a wireless device may establish or resume the connection with the network, based on that the counted number is greater than or equal to the threshold value upon expiry of the logging validity timer.

According to some embodiments of the present disclosure, a wireless device may stop the logging validity timer and reset the number of failures, upon detecting a successful data transmission. In this case, a wireless device may not establish or resume a connection with the network since the counted number is not equal to or bigger than a threshold value.

For example, a wireless device may reset the number of failures based on that the counted number is smaller than the threshold value upon expiry of the logging validity timer.

For other example, the wireless device may reset the number of failures upon entering into the connected state.

According to some embodiments of the present disclosure, the failures of the data transmissions may include at least one failure of paging response for mobile-terminated data transmission. A wireless device may log information related to each of the failures and count a number of the failures, while the logging validity timer is running.

In this case, a wireless device may stop the logging validity timer and reset the number of failures, upon detecting a successful RRC connection establishment.

In step S1506, a wireless device may transmit, to the network, the logged information related to each of the failures.

For example, a wireless device may transmit, to the network, a report availability. A wireless device may receive, from the network, an uplink information request in response to the report availability. A wireless device may transmit, to the network, the logged information upon receiving the uplink information request.

For example, the report availability may be transmitted to the network via at least one of Uplink Control Information (UCI), Medium Access Control (MAC) Control Element (CE), or a Radio Resource Control (RRC) message.

For example, a wireless device may perform a random access procedure to establish or resume a connection in step S1505. For example, a wireless device may transmit, to the network, a message5 (msg5) including the report availability in the random access procedure.

In other words, for example, the wireless device may send the report availability via L1 (for example, UCI), L2 (for example, MAC CE) or L3 signalling (Msg5, for example, RRC setup complete, RRC reconfiguration complete, RRC resume complete, RRC reestablishment complete).

According to some embodiments of the present disclosure, a wireless device may transmit, to the network, at least one of (1) information on signal quality for serving cell and/or neighbor cells which are measured in the idle state and/or the inactive state, and/or (2) information on random access failures before establishing or resuming the connection with the network.

According to some embodiments of the present disclosure, the wireless device may receive, from the network via system information, a request for logging idle mode measurement. In this case, a wireless device may receive, from the network via dedicated L1, L2, and/or L3 signalling, a request for logging information related to data transmission failure.

According to some embodiments of the present disclosure, the wireless device is in communication with at least one of a user equipment, a network, or an autonomous vehicle other than the wireless device.

Hereinafter, an example of a method for network optimization mechanism and efficient UE control, according to some embodiments of the present disclosure, is described.

In this example, the UE may transit to RRC_CONNECTED to inform Report availability, if a number of data transmission failures exceeds a threshold. For example, this procedure could be applied to data transmission in RRC_IDLE and RRC_INACTIVE.

According to some embodiments of the present disclosure, the Report to be sent to the network may include at least one of (1) data transmission failure information, (2) signal quality, serving cell, and neighbor cells information, and/or (3) RACH failure information.

(1) Data transmission failure information may include at least one of the followings:
   No grant for data transmission is received
   Coverage level (for example, CE level, CE mode) when data transmission has failed
   NO ACK for data transmission
   NACK after data transmission Type of data transmission (for example, EDT, PUR, 2-step RA, 4-step RA, Msg2 based downlink data transmission, Msg4 based downlink data transmission)

State of data transmission (for example, RRC_IDLE, RRC_INACTIVE)

Power level (for example, maxTxPowerReached, and/or power level when failure is detected)

Number of data transmission attempts

Failure condition (for example, failure case such as no ACK, no grant)

Time information (for example, that the failure is detected, that the time elapsed after the first failure is detected)

Type of core network that the failure is detected (for example, EPS, 5GC)

(2) Signal quality, serving and neighbour cells information may include at least one of the followings:

Measurement results of serving cell and/or neighbour cells (for example, measResultList, and/or measResultNeighCells)

RSRP, RSRQ, CQI information (for example, rsrq-Range, rsrq-Type, cqi-report, measResultFailedCell)

Cell information (for example, one or more than one cell identity that failure is detected)

WLAN measurement results

Bluetooth measurement results

Satellite communication measurement results (3) RACH failure information may include at least one of the numberOfPreamblesSent and/or contentionDetcted.

Figure 16:
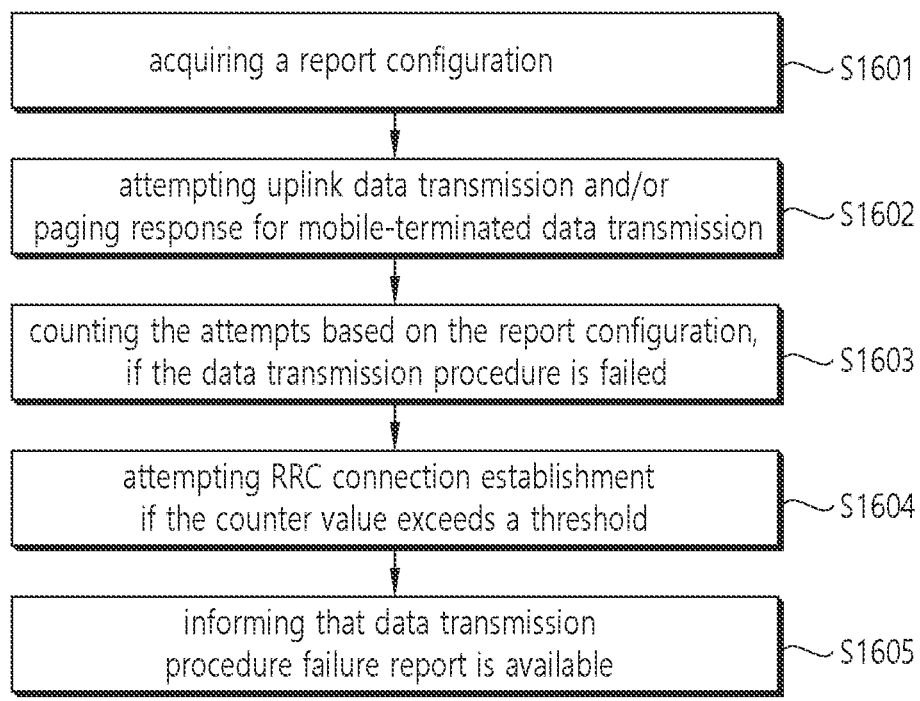
FIG. 16 shows an example of a method for reporting data transmission procedure failure for network optimization in a wireless communication system, according to some embodiments of the present disclosure.

FIG. 16 shows an example of a method for reporting data transmission procedure failure for network optimization in a wireless communication system, according to some embodiments of the present disclosure.

In step S1601, a UE may acquire a report configuration.

For example, a network may send report configuration to a UE. The report configuration may be transmitted via broadcast and/or dedicated signalling. Otherwise, some report configuration may be preconfigured in the UE. The report configuration could be delivered via L1, L2 and/or L3 signalling.

For example, the report configuration may configure the UE to report including at least one of (1) data transmission failure information, (2) signal quality, serving cell, and/or neighbour cells information, and/or (3) RACH failure information.

For example, the network may request logging for idle mode measurement via system information while logging for data transmission failure is requested via dedicated L1, L2, and/or L3 signalling.

For example, the UE may store detailed data transmission information such as type of data transmission and failure cause without network configuration.

According to some embodiments of the present disclosure, a UE may be configured with a threshold for failure count.

For example, the network may configure more than one threshold to identify report condition.

For example, the network may configure (1) a threshold for RACHless data transmission, and/or (2) another threshold for RACH based data transmission.

For example, the network may configure a separate threshold for satellite based data transmission.

According to some embodiments of the present disclosure, a UE may be configured with logging validity timer.

For example, the logging validity timer may start when the UE transits to RRC_IDLE or RRC_INACTIVE.

For example, the logging validity timer may start when the UE receives the report configuration.

For example, the logging validity timer may start when the first data transmission procedure failure is detected.

For example, a value for the logging validity timer may be a configured value. The value for the logging validity timer may be configured via broadcast or dedicated signalling.

For example, as value for the logging validity timer may be fixed value (for example, 48 hours).

In step S1602, the UE may attempt uplink data transmission and/or paging response for mobile-terminated data transmission.

If failure for the uplink data transmission and/or paging response is detected, the UE may store UE variables for report (for example, VarDataTransFailureReport).

In step S1603, if mobile-originated and/or mobile-terminated data transmission procedure is failed, the UE may count the attempts based on the report configuration. The UE may increment a value for a counter whenever the transmission fails.

For example, the UE may maintain a counter for (1) mobile-originated RACHless data transmission failures, and (2) RACH-based data transmission failures, respectively.

For example, the UE may maintain a counter only for mobile-originated RACHless data transmission.

For example, the UE may reset the counter value if data transmission procedure is successfully completed.

For example, the UE may reset the counter value if the UE transits to RRC_CONNECTED.

In step S1604, the UE may attempt RRC connection establishment if the counter value exceeds a threshold.

For example, if the UE's counter value reaches the threshold before expiry of the logging validity timer, the UE may transit to RRC_CONNECTED to send Report availability, For example, if the UE's counter value is greater than or equal to the threshold upon expiry of the logging validity timer, the UE may transit to RRC_CONNECTED to send Report availability.

In step S1605, the UE may inform that data transmission procedure failure report is available.

The UE may send Report availability via L1 (for example, Uplink Control Information (UCI)), L2 (for example, Medium Access Control (MAC) Control Element (CE)), and/or L3 signalling (for example, Msg5 in RACH procedure, RRC setup complete, RRC reconfiguration complete, RRC resume complete, RRC reestablishment complete).

According to some embodiments of the present disclosure, upon receiving Uplink Information Request from the network, the UE may transmit the stored information such as (1) data transmission failure information, (2) signal quality, serving cell, and/or neighbour cells information, and/or (3) RACH failure information.

Figure 17:
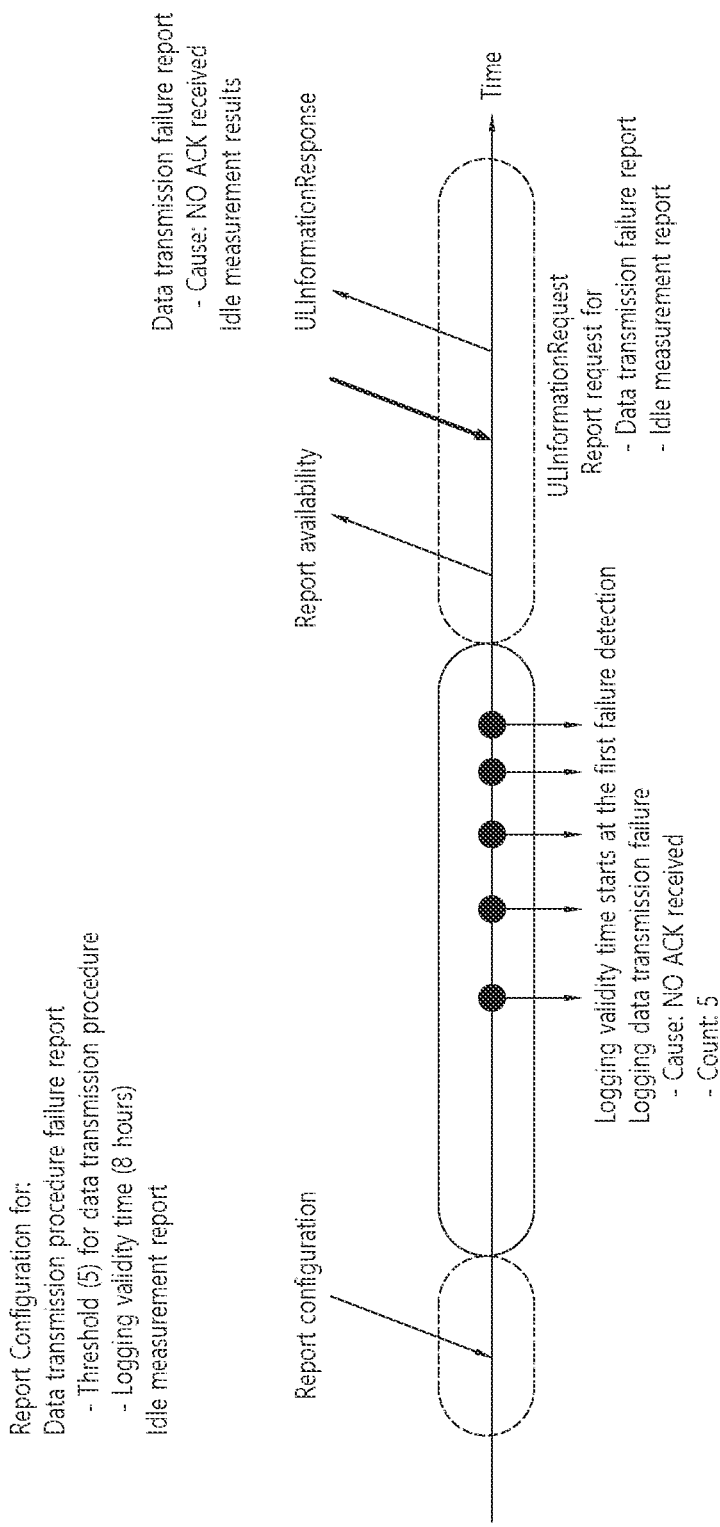
FIG. 17 shows an example of a method for reporting data transmission procedure failure in a wireless communication system, according to some embodiments of the present disclosure.

FIG. 17 shows an example of a method for reporting data transmission procedure failure in a wireless communication system, according to some embodiments of the present disclosure.

In particular, in FIG. 17, a UE may start a logging validity timer upon detecting a first failure of data transmission.

For example, the UE may receive Report configuration for Data transmission procedure failure report including a threshold (for example, 5) and a logging validity timer (for example, 8 hours). The UE may also receive IDLE mode measurement configuration.

The UE may transit to RRC_IDLE and perform RRC_IDLE data transmission procedures.

For example, if the UE detects data transmission procedure failure, the UE may count the failure.

For example, if the logging validity timer is not running, the UE may start the logging validity timer.

For other example, if data transmission is successfully completed, the UE may reset the count and stops the logging validity timer.

For example, if the number of data transmission procedure failures reached to the threshold (for example, 5) while the logging validity timer is running, the UE may perform RRC connection establishment procedure.

For other example, if the logging validity timer is expired, the UE may reset the counter value.

Figure 18:
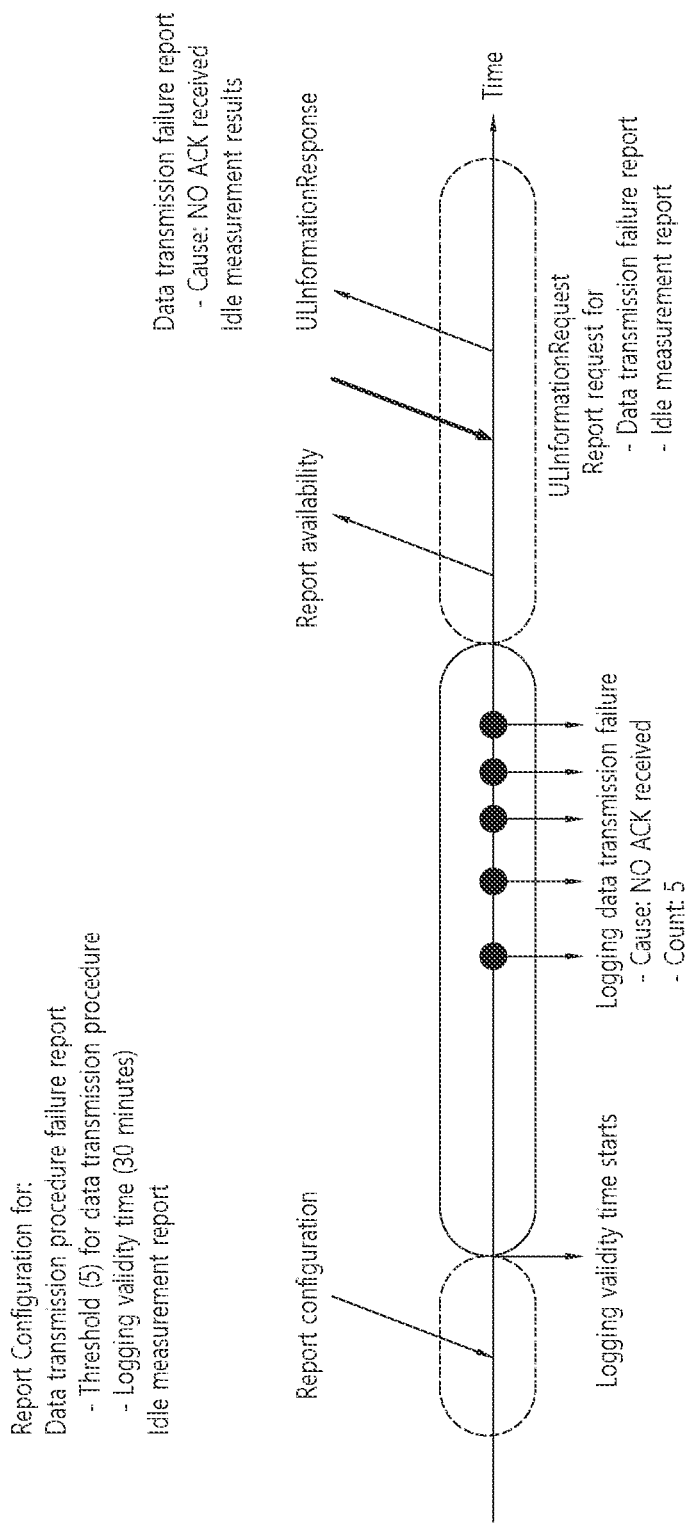
FIG. 18 shows an example of reporting data transmission procedure failure for network optimization in a wireless communication system, according to some embodiments of the present disclosure.

FIG. 18 shows an example of reporting data transmission procedure failure for network optimization in a wireless communication system, according to some embodiments of the present disclosure.

In particular, in FIG. 18, a UE may start a logging validity timer upon entering to an idle state and/or an inactive state.

For example, the UE may receive Report configuration for Data transmission procedure failure report including a threshold (for example, 5) and a logging validity timer (for example, 30 minutes). The UE may receive INACTIVE measurement configuration.

For example, the UE may start the logging validity timer when the UE transits to RRC_INACTIVE.

For example, the UE may perform RRC_INACTIVE data transmission procedures.

For example, if data transmission procedure in RRC_INACTIVE fails, the UE may count the failure.

For other example, if data transmission is successfully completed, the UE may reset the count.

For example, upon expiry of the logging validity timer, if the number of data transmission procedure failures reached to the threshold (for example, 5), the UE may perform RRC connection establishment.

For other example, the UE may discard the UE variables for report.

Hereinafter, operations for reporting data transmission procedure failure for network optimization are described. The following operations could be applied to implementations of the present disclosure for reporting the data transmission procedure failure for network optimization.

According to some embodiments of the present disclosure, the data transmission procedure failure report may include Automatic Neighbor Relation (ANR) report.

For example, the ANR report may include the logging information which is related to the data transmission failures, while in an idle state and/or an inactive state.

For example, a wireless device may perform ANR reporting for NB-IoT only using idle-mode measurements.

For example, a wireless device may support RACH report for NB-IoT.

For example, a wireless device may support Self-Organizing Networks (SON) SON-ANR.

For example, a wireless device may support the SON/ANR reporting in NB-IoT for network optimisation, rather than immediately updating neighbour relations like with LTE ANR. For example, the SON/ANR reporting may not be time critical.

For example, SON reporting may not trigger RRC connection establishment/resume.

For example, a wireless device may support RLF report. For example, the UE may inform network about having an RLF report available via rlf-InfoAvailable indication during the initial RRC connection re-establishment process after RLF. The rlf-InfoAvailable parameter may be included in Msg5 of the RRC connection re-establishment process.

It may be up to the network to decide when to request for the RLF report, using UEInformationRequest/UEInformationResponse procedure.

In case of no/failed RRC connection re-establishment, the UE may store the RLF report for indicating rlf-InfoAvailable in Msg5 of later connection establishment.

For example, a wireless device may support the following parameters for RLF reporting in NB-IoT:
Failed cell ECGI
Last Serving Cell RSRP/RSRQ (Whether OK for CP-solution is FFS)
Absolute Time Stamp (optional, if available)
Location Info (optional, if available)

For example, neither rlf-InfoAvailable indication nor RLF report may be included in the Msg3 of the EDT procedure to indicate to the network about an available RLF report.

For example, a wireless device may support ANR measurement reporting using the UE Information Request/Response framework.

For example, ANR-InfoAvailable indication can be reported in EDT Msg3.

For example, ANR procedure may include the following operations.
  (1) UE may receive "measurement" configuration in dedicated signalling.
  (2) When the UE is released to idle:
      The UE may perform the instructed measurements according to existing RAN4 cell reselection measurement performance requirements.
      CGI reading may be limited to cells being above a certain threshold.
  (3) Reporting takes place, upon network request, next time UE is connected mode again.

For example, dedicated ANR measurement configuration may be provided in RRCConnectionRelease message only.

For example, the list of frequencies where to perform the measurements can be optionally provided in dedicated signalling, as a subset of the frequencies signalled in system information. For example, the list frequencies signalled in system information may be used.

For example, maximum of 8 carriers can be configured.

For example, a blacklist of cells can be optionally signalled per carrier.

For example, ANR measurements may be only performed while UE remains camped on the same cell from which the ANR measurement configuration was received. (For example, when the UE changes cell, the ANR measurements are stopped).

For example, neighbour cell relaxed monitoring criteria and search criteria do not apply while performing an ANR measurement.

For example, ANR measurement does not affect DRX/eDRX operation.

For example, CGI-reading may apply to strongest cell on each frequency, if above the RSRP threshold.

For example, the RSRP threshold may be an absolute threshold that is common to all frequencies.

For example, ANR-InfoAvailable indication may be reported in and only in RRC Connection Setup Complete, RRC Connection Resume Complete, RRC Connection Reestablishment Complete, and/or RRC Connection Resume Request for EDT.

For example, the ANR report might be empty for a given carrier, if a measurement is performed and no strong cell is found.

For example, UE may indicate the availability of the report if (1) a report is available and/or (2) if the RPLMN is included in the list of EPLMNs stored by the UE when the ANR measurement was configured.

For example, the ANR report is discarded after (1) timer expiry, (2) power off or detach, and/or (3) reporting anrInfoAvailable and returning to idle.

For example, UE Information Request/Response may be the only reporting procedure for ANR measurement.

For example, for a measured carrier the following information may be included:
  Carrier frequency.
  Strongest cell PCI, RSRP/RSRQ.
  Strongest cell CGI-info if RSRP above the threshold.

For example, serving cell RSRQ/RSRP and CGI may be included in the ANR report.

For example, ANR reporting may be optional for NB-IoT UEs with capability signaling.

Figure 19:
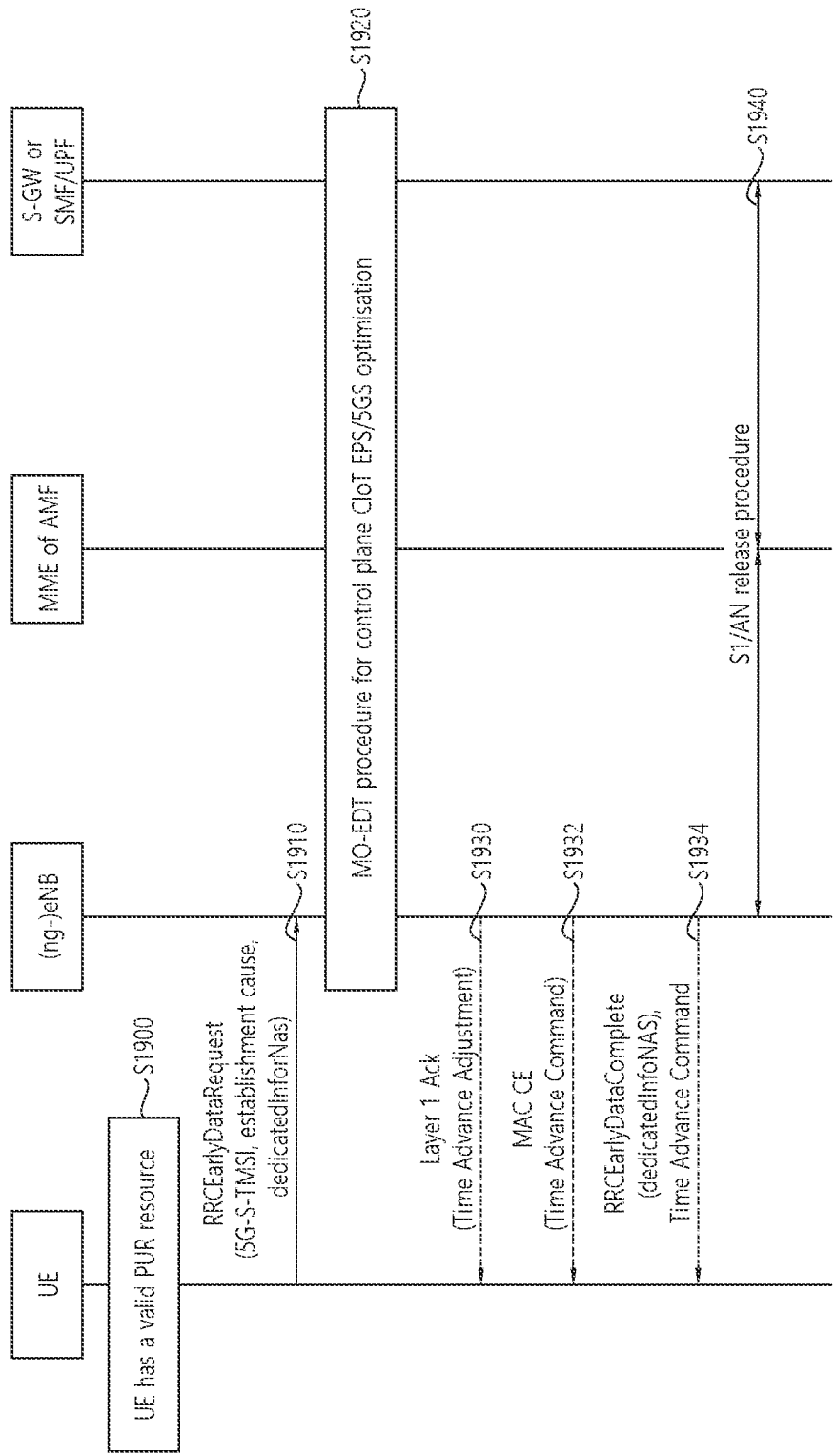
FIG. 19 shows an example of transmission using PUR for the control plane cellular IoT (CIoT) evolved packet system (EPS)/5G system (5GS) optimizations to which implementations of the present disclosure is applied.

FIG. 19 shows an example of transmission using PUR for the control plane cellular IoT (CIoT) evolved packet system (EPS)/5G system (5GS) optimizations to which implementations of the present disclosure is applied.

Transmission using PUR for control plane CIoT EPS optimization, and for control plane CIoT 5GS optimization is characterized as below:
  UL user data are transmitted using the PUR resource in a NAS message concatenated in RRCEarlyDataRequest message on CCCH;
  If there is no downlink data, the (ng-)eNB may terminate the procedure by sending a layer 1 acknowledgement optionally containing a Time Advance Command, a MAC Time advance Command or RRCEarlyDataComplete with no user data;
  DL user data, if any, are transmitted in a NAS message concatenated in RRCEarlyDataComplete message on CCCH;
  There is no transition to RRC_CONNECTED.

In step S1900, the UE has determined that the PUR resource can be used (e.g., PUR enabled in the cell, valid time alignment, etc.).

In step S1910, the UE transmits RRCEarlyDataRequest message including UL user data in a NAS message (e.g., dedicatedInfoNas) over the PUR resource.

If the UL data are too large to be included in RRCEarlyDataRequest, the UE can use the PUR resource to transmit RRCConnectionRequest. The procedure will fall back to the legacy RRC connection establishment procedure, a new cell radio network temporary identity (C-RNTI) can be assigned.

After step S1910, the (ng-)eNB may request the UE to abort the transmission using PUR by sending a Layer 1 fallback indication.

In step S1920, the MO-EDT procedure for control plane CIoT EPS/5GS optimizations is performed.

In step S1930, if the (ng-)eNB is aware that there is no pending DL data or signaling, the (ng-)eNB can send a Layer 1 ACK optionally containing a Time Advance Adjustment to the UE to update the TA and terminate the procedure.

In step S1932, if the (ng-)eNB is aware that there is no further data or signaling, the (ng-)eNB can send a Time Advance Command to update the TA and terminate the procedure.

In step S1934, the (ng-)eNB may transmit RRCEarlyDataComplete message which may optionally including DL user data in a NAS message (e.g., dedicatedInfoNAS). A Time Advance Command can also be included.

If the MME/AMF or the (ng-)eNB decides to move the UE to RRC_CONNECTED mode, RRCConnectionSetup message is sent in steps S1930 to S1934 to fall back to the legacy RRC connection establishment procedure, a new C-RNTI can be assigned. The (ng-)eNB will discard the zero-length NAS PDU received in RRCConnectionSetupComplete message.

If none of Layer 1 Acknowledgement, MAC Time advance Command, RRCEarlyDataComplete and, in case of fallback, RRCConnectionSetup is received in response to RRCEarlyDataRequest, the UE considers the UL data transmission not successful.

In step S1940, S1/AN release procedure is performed.

Figure 20:
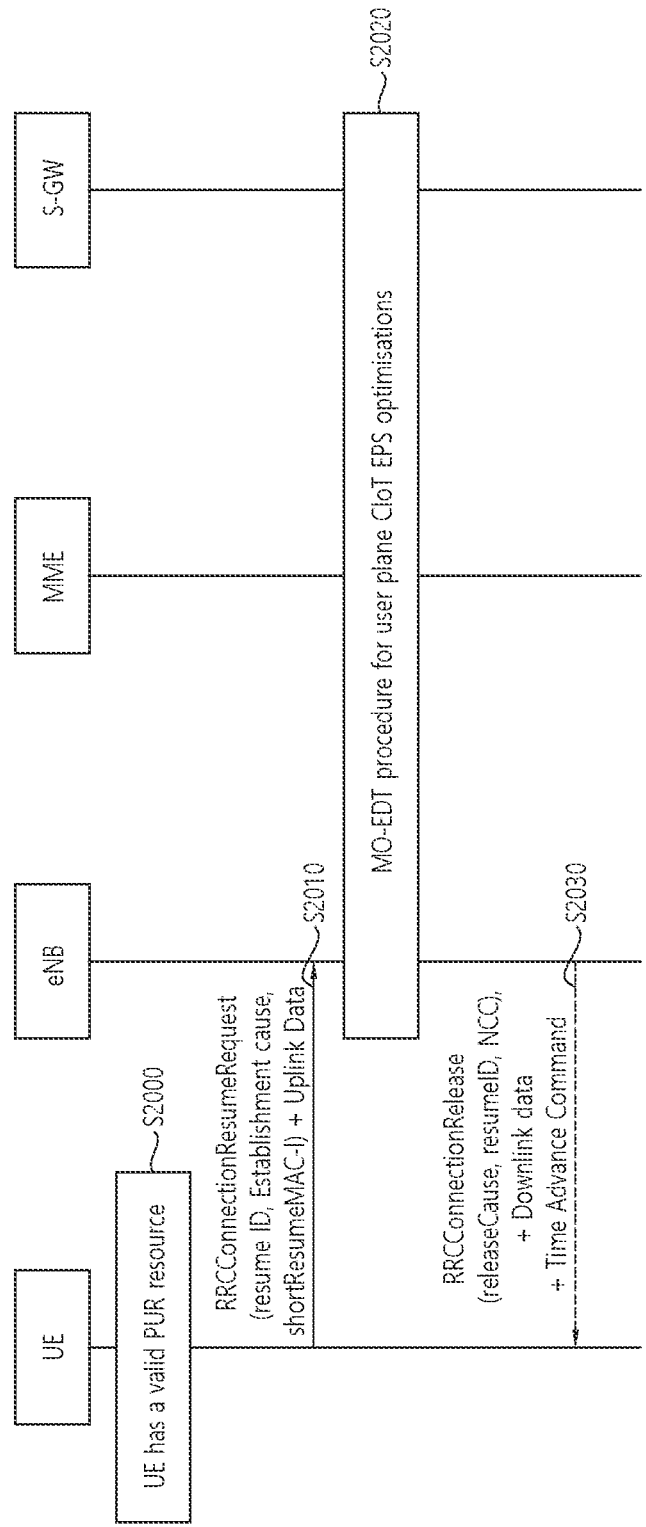
FIG. 20 shows an example of transmission using PUR for the user plane CIoT EPS optimization to which implementations of the present disclosure is applied.

FIG. 20 shows an example of transmission using PUR for the user plane CIoT EPS optimization to which implementations of the present disclosure is applied.

Figure 21:
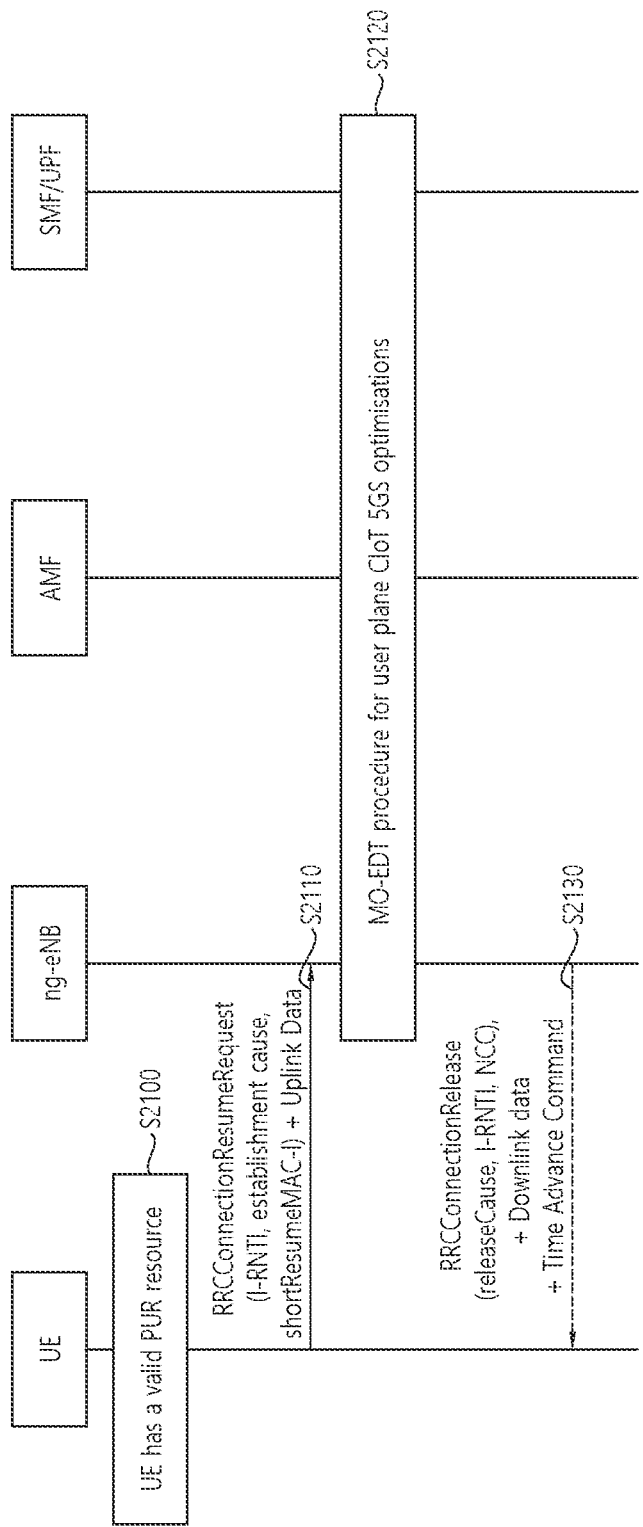
FIG. 21 shows an example of transmission using PUR for the user plane CIoT 5GS optimization to which implementations of the present disclosure is applied.

FIG. 21 shows an example of transmission using PUR for the user plane CIoT 5GS optimization to which implementations of the present disclosure is applied.

Transmission using PUR for user plane CIoT EPS optimization, and for user plane CIoT 5GS optimization are characterized as below:
  The UE is in RRC_IDLE and has a valid PUR resource;
  The UE has been provided with a NextHopChainingCount in the RRCConnectionRelease message with suspend indication;
  UL user data are transmitted on DTCH multiplexed with RRCConnectionResumeRequest message on CCCH;
  DL user data are optionally transmitted on DTCH multiplexed with RRCConnectionRelease message on DCCH;
  The user data in UL and DL are ciphered. The keys are derived using the NextHopChainingCount provided in the RRCConnectionRelease message of the previous RRC connection;
  The RRCConnectionRelease message is integrity protected and ciphered using the newly derived keys;
  There is no transition to RRC_CONNECTED.

In steps S1600/S2100, the UE has validated the PUR resource according to the configured criteria.

In steps S2010/S2110, the UE transmits RRCConnectionResumeRequest message together with UL user data over the PUR resource.

If the user data are too large to be fully included in the transmission using PUR, the UE can use PUR to transmit RRCConnectionResumeRequest and a segment of the user data. The procedure will fall back to the legacy RRC Connection Resume procedure, and a new C-RNTI can be assigned.

After steps S2010/S2110, the (ng-)eNB may request the UE to abort the transmission using PUR by sending a Layer 1 fallback indication.

In steps S2020/S2120, MO-EDT procedure for user plane CIoT EPS/5GS optimizations is performed.

In step S2030/S2130, the (ng-)eNB may transmit RRCConnectionRelease message optionally together with DL user data. A Time Advance Command can also be included.

If the MME/AMF or the (ng-)eNB decides to move the UE to RRC_CONNECTED mode, RRCConnectionResume message is sent in steps S2030/S2130 to fall back to the RRC connection resume procedure. In that case, the RRCConnectionResume message is integrity protected and ciphered with the keys derived in steps S2000/S2100 and the UE ignores the NextHopChainingCount included in the RRCConnectionResume message. A new C-RNTI can be assigned. DL data can be transmitted on DTCH multiplexed with the RRCConnectionResume message. In addition, an RRCConnectionSetup can also be sent in steps S2030/S2130 to fall back to the RRC connection establishment procedure.

Hereinafter, an apparatus for reporting data transmission procedure failure for network optimization in a wireless communication system, according to some embodiments of the present disclosure, will be described. Herein, the apparatus may be a wireless device (100 or 200) in FIGS. 2, 3, and 5.

For example, a wireless device may perform methods described in FIGS. 12 to 17. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to configure a logging validity timer for failure reporting of data transmissions. The processor 102 may be configured to perform the data transmissions to a network in idle state and/or inactive state. The processor 102 may be configured to detect failures of the data transmissions. The processor 102 may be configured to log information related to each of the failures and count a number of the failures, while the logging validity timer is running. The processor 102 may be configured to establish or resume a connection with the network based on that the counted number is equal to or bigger than a threshold value. The processor 102 may be configured to control the transceiver 106 to transmit, to the network, the logged information related to each of the failures.

According to some embodiments of the present disclosure, the processor 102 may be configured to start the logging validity timer upon entering into the idle state and/or the inactive state.

According to some embodiments of the present disclosure, the processor 102 may be configured to start the logging validity timer upon receiving a report configuration for the logged information from the network.

According to some embodiments of the present disclosure, the processor 102 may be configured to start the logging validity timer upon detecting a first failure of the data transmission procedure.

According to some embodiments of the present disclosure, the establishing or resuming the connection with the network further comprises establishing or resuming the connection with the network, based on that the counted number reaches the threshold value before expiry of the logging validity timer.

According to some embodiments of the present disclosure, the establishing or resuming the connection with the network further comprises establishing or resuming the connection with the network, based on that the counted number is greater than or equal to the threshold value upon expiry of the logging validity timer.

According to some embodiments of the present disclosure, a value for the logging validity timer may be a preconfigured by the wireless device.

According to some embodiments of the present disclosure, a value for the logging validity timer may be a configured via broadcast or dedicated signalling by the network.

According to some embodiments of the present disclosure, a value for the logging validity timer may be a fixed value.

According to some embodiments of the present disclosure, the processor 102 may be configured to control the transceiver 106 to transmit, to the network, a report availability. The processor 102 may be configured to control the transceiver 106 to receive, from the network, an uplink information request in response to the report availability. For example, the logged information may be transmitted to the network upon receiving the uplink information request.

For example, the report availability may be transmitted to the network via at least one of Uplink Control Information (UCI), Medium Access Control (MAC) Control Element (CE), or a Radio Resource Control (RRC) message.

According to some embodiments of the present disclosure, the processor 102 may be configured to stop the logging validity timer and reset the number of failures, upon detecting a successful data transmission.

According to some embodiments of the present disclosure, the failures of the data transmissions may include at least one failure of paging response for mobile-terminated data transmission.

In this case, the processor 102 may be configured to stop the logging validity timer and reset the number of failures, upon detecting a successful RRC connection establishment.

According to some embodiments of the present disclosure, the logged information related to the each of the failures may include at least one of (1) information on whether grant for the data transmissions is received, (2) information on coverage level, (3) information on whether positive acknowledgement (ACK) is received, (4) information on whether a negative acknowledgement (NACK) is received, (5) information on each type of the data transmissions, (6) information on connection state of the wireless device, (7) information on power level, (8) information on failure condition, (9) time information, and/or (10) type of core network.

According to some embodiments of the present disclosure, the processor 102 may be configured to stop control the transceiver 106 to transmit, to the network, at least one of (1) information on signal quality for serving cell and/or neighbor cells, and/or (2) information on random access failures.

According to some embodiments of the present disclosure, the processor 102 may be configured to be in communication with at least one of a user equipment, a network, or an autonomous vehicle other than the wireless device.

Hereinafter, a processor for a wireless device for reporting data transmission procedure failure for network optimization in a wireless communication system, according to some embodiments of the present disclosure, will be described.

The processor may be configured to control the wireless device to configure a logging validity timer for failure reporting of data transmissions. The processor may be configured to control the wireless device to perform the data transmissions to a network in idle state and/or inactive state. The processor may be configured to control the wireless device to detect failures of the data transmissions. The processor may be configured to control the wireless device to log information related to each of the failures and count a number of the failures, while the logging validity timer is running. The processor may be configured to control the wireless device to establish or resume a connection with the network based on that the counted number is equal to or bigger than a threshold value. The processor may be configured to control the wireless device to transmit, to the network, the logged information related to each of the failures.

According to some embodiments of the present disclosure, the processor may be configured to control the wireless device to start the logging validity timer upon entering into the idle state and/or the inactive state.

According to some embodiments of the present disclosure, the processor may be configured to control the wireless device to start the logging validity timer upon receiving a report configuration for the logged information from the network.

According to some embodiments of the present disclosure, the processor may be configured to control the wireless device to start the logging validity timer upon detecting a first failure of the data transmission procedure.

According to some embodiments of the present disclosure, the establishing or resuming the connection with the network further comprises establishing or resuming the connection with the network, based on that the counted number reaches the threshold value before expiry of the logging validity timer.

According to some embodiments of the present disclosure, the establishing or resuming the connection with the network further comprises establishing or resuming the connection with the network, based on that the counted number is greater than or equal to the threshold value upon expiry of the logging validity timer.

According to some embodiments of the present disclosure, a value for the logging validity timer may be a preconfigured by the wireless device.

According to some embodiments of the present disclosure, a value for the logging validity timer may be a configured via broadcast or dedicated signalling by the network.

According to some embodiments of the present disclosure, a value for the logging validity timer may be a fixed value.

According to some embodiments of the present disclosure, the processor may be configured to control the wireless device to transmit, to the network, a report availability. The processor may be configured to control the wireless device to receive, from the network, an uplink information request in response to the report availability. For example, the logged information may be transmitted to the network upon receiving the uplink information request.

For example, the report availability may be transmitted to the network via at least one of Uplink Control Information (UCI), Medium Access Control (MAC) Control Element (CE), or a Radio Resource Control (RRC) message.

According to some embodiments of the present disclosure, the processor may be configured to control the wireless device to stop the logging validity timer and reset the number of failures, upon detecting a successful data transmission.

According to some embodiments of the present disclosure, the failures of the data transmissions may include at least one failure of paging response for mobile-terminated data transmission.

In this case, the processor may be configured to control the wireless device to stop the logging validity timer and reset the number of failures, upon detecting a successful RRC connection establishment.

According to some embodiments of the present disclosure, the logged information related to the each of the failures may include at least one of (1) information on whether grant for the data transmissions is received, (2) information on coverage level, (3) information on whether positive acknowledgement (ACK) is received, (4) information on whether a negative acknowledgement (NACK) is received, (5) information on each type of the data transmissions, (6) information on connection state of the wireless device, (7) information on power level, (8) information on failure condition, (9) time information, and/or (10) type of core network.

According to some embodiments of the present disclosure, the processor may be configured to control the wireless device to stop transmit, to the network, at least one of (1) information on signal quality for serving cell and/or neighbor cells, and/or (2) information on random access failures.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for reporting data transmission procedure failure for network optimization in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to configure a logging validity timer for failure reporting of data transmissions. The stored a plurality of instructions may cause the wireless device to perform the data transmissions to a network in idle state and/or inactive state. The stored a plurality of instructions may cause the wireless device to detect failures of the data transmissions. The stored a plurality of instructions may cause the wireless device to log information related to each of the failures and count a number of the failures, while the logging validity timer is running. The stored a plurality of instructions may cause the wireless device to establish or resume a connection with the network based on that the counted number is equal to or bigger than a threshold value. The stored a plurality of instructions may cause the wireless device to transmit, to the network, the logged information related to each of the failures.

According to some embodiments of the present disclosure, the stored a plurality of instructions may cause the wireless device to start the logging validity timer upon entering into the idle state and/or the inactive state.

According to some embodiments of the present disclosure, the stored a plurality of instructions may cause the wireless device to start the logging validity timer upon receiving a report configuration for the logged information from the network.

According to some embodiments of the present disclosure, the stored a plurality of instructions may cause the wireless device to start the logging validity timer upon detecting a first failure of the data transmission procedure.

According to some embodiments of the present disclosure, the establishing or resuming the connection with the network further comprises establishing or resuming the connection with the network, based on that the counted number reaches the threshold value before expiry of the logging validity timer.

According to some embodiments of the present disclosure, the establishing or resuming the connection with the network further comprises establishing or resuming the connection with the network, based on that the counted number is greater than or equal to the threshold value upon expiry of the logging validity timer.

According to some embodiments of the present disclosure, a value for the logging validity timer may be a preconfigured by the wireless device.

According to some embodiments of the present disclosure, a value for the logging validity timer may be a configured via broadcast or dedicated signalling by the network.

According to some embodiments of the present disclosure, a value for the logging validity timer may be a fixed value.

According to some embodiments of the present disclosure, the stored a plurality of instructions may cause the wireless device to transmit, to the network, a report availability. The stored a plurality of instructions may cause the wireless device to receive, from the network, an uplink information request in response to the report availability. For example, the logged information may be transmitted to the network upon receiving the uplink information request.

For example, the report availability may be transmitted to the network via at least one of Uplink Control Information (UCI), Medium Access Control (MAC) Control Element (CE), or a Radio Resource Control (RRC) message.

According to some embodiments of the present disclosure, the stored a plurality of instructions may cause the wireless device to stop the logging validity timer and reset the number of failures, upon detecting a successful data transmission.

According to some embodiments of the present disclosure, the failures of the data transmissions may include at least one failure of paging response for mobile-terminated data transmission.

In this case, the stored a plurality of instructions may cause the wireless device to stop the logging validity timer and reset the number of failures, upon detecting a successful RRC connection establishment.

According to some embodiments of the present disclosure, the logged information related to the each of the failures may include at least one of (1) information on whether grant for the data transmissions is received, (2) information on coverage level, (3) information on whether positive acknowledgement (ACK) is received, (4) information on whether a negative acknowledgement (NACK) is received, (5) information on each type of the data transmissions, (6) information on connection state of the wireless device, (7) information on power level, (8) information on failure condition, (9) time information, and/or (10) type of core network.

According to some embodiments of the present disclosure, the stored a plurality of instructions may cause the wireless device to stop transmit, to the network, at least one of (1) information on signal quality for serving cell and/or neighbor cells, and/or (2) information on random access failures.

According to some embodiments of the present disclosure, the stored a plurality of instructions may cause the wireless device to be in communication with at least one of a user equipment, a network, or an autonomous vehicle other than the wireless device.

Hereinafter, a method for reporting data transmission procedure failure for network optimization performed by a base station (BS) in a wireless communication system, according to some embodiments of the present disclosure, will be described.

The BS may transmit, to a wireless device, a report configuration including a configuration for a logging validity timer for failure reporting of data transmission. The BS may perform a random access procedure with a wireless device. The BS may receive, from the wireless device, a report availability for the failure reporting. The BS may transmit, to the wireless device, an uplink information request. The BS may receive, from the wireless device, a logged information for failures of the data transmission.

For example, the BS may perform network optimization based on the received logged information.

Hereinafter, a base station (BS) for reporting data transmission procedure failure for network optimization in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, a report configuration including a configuration for a logging validity timer for failure reporting of data transmission. The processor may be configured to perform a random access procedure with a wireless device. The processor may be configured to control the transceiver to receive, from the wireless device, a report availability for the failure reporting. The processor may be configured to control the transceiver to transmit, to the wireless device, an uplink information request. The processor may be configured to control the transceiver to receive, from the wireless device, a logged information for failures of the data transmission.

The present disclosure can have various advantageous effects.

According to some embodiments of the present disclosure, a wireless device could efficiently perform data transmission procedure failure report for network optimization.

For example, if a wireless device suffers from continuous data transmission procedure failures in RRC_IDLE or RRC_INACTIVE, the wireless device could transit to RRC_CONNECTED and send report availability and/or the failure report for network optimization.

For example, by sending data transmission fail information and cell quality information reports, the network could control operations of a wireless device and network resources more efficiently.

For example, the wireless device could save power consumption, since the wireless device may not discard the available report after certain amount of time.

According to some embodiments of the present disclosure, a wireless communication system could efficiently perform network optimization by reporting data transmission procedure failure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method, comprising,
    receiving, by a wireless device from a network, information for a Preconfigured Uplink Resource (PUR) for data transmission while in idle state or inactive state;
    receiving, by the wireless device from the network, a report configuration information for data logging;
    receiving, by the wireless device from the network, information for a threshold value for data transmission based on the PUR;
    configuring, by the wireless device, a logging validity timer for failure reporting of data transmissions;
    starting, by the wireless device, the logging validity timer upon entering into idle state or inactive state;
    attempting, by the wireless device, one or more data transmissions based on the PUR to the network while in idle state or inactive state;
    incrementing, by the wireless device, a counter upon detecting a failure of the attempted data transmission based on the PUR;
    performing, by the wireless device, the data logging based on the report configuration upon detecting the failure of the attempted data transmission only while the logging validity timer is running,
    wherein logged information includes the (i) information informing that the data transmission is attempted based on the PUR, (ii) information related to the detected failure, and (iii) information related to the counter for the detected failure;
    establishing or resuming, by the wireless device, a Radio Resource Control (RRC) connection with the network based on the counter being reached to the threshold value; and
    transmitting, by the wireless device to the network, the logged information based on the RRC connection.

2. The method of claim 1, wherein the establishing or resuming, by the wireless device, the RRC connection with the network further comprises,
    establishing or resuming the RRC connection with the network, based on the counter being reached to the threshold value only while of the logging validity timer is running.

3. The method of claim 1, wherein a value for the logging validity timer is a preconfigured by the wireless device.

4. The method of claim 1, wherein a value for the logging validity timer is a configured via broadcast or dedicated signalling by the network.

5. The method of claim 1, wherein a value for the logging validity timer is a fixed value.

6. The method of claim 1, wherein the method further comprises,
    transmitting, by the wireless device to the network, a report availability; and
    receiving, by the wireless device from the network, an uplink information request in response to the report availability,
    wherein the logged information is transmitted to the network upon receiving the uplink information request.

7. The method of claim 6, wherein the report availability is transmitted to the network via at least one of Uplink Control Information (UCI), Medium Access Control (MAC) Control Element (CE), or a Radio Resource Control (RRC) message.

8. The method of claim 1, wherein the method further comprises,
    stopping, by the wireless device, the logging validity timer upon detecting a successful data transmission; and
    resetting, by the wireless device, the number of failures upon detecting the successful data transmission.

9. The method of claim 1, wherein the detected failure includes a failure of paging response for mobile-terminated data transmission.

10. The method of claim 9, wherein the method further comprises,
    stopping, by the wireless device, the logging validity timer upon detecting a successful RRC connection establishment; and
    resetting, by the wireless device, the number of failures upon detecting the successful RRC connection establishment.

11. The method of claim 1, wherein the logged information related to the each of the failures includes at least one of (1) information related to whether grant for the data transmissions is received, (2) information related to coverage level, (3) information related to whether positive acknowledgement (ACK) is received, (4) information related to whether a negative acknowledgement (NACK) is received, (5) information related to each type of the one or more data transmissions, (6) information related to connection state of the wireless device, (7) information related to a power level, (8) information related to a failure condition, (9) time information, and/or (10) a type of a core network.

12. The method of claim 1, wherein the method further comprises,
wherein the logged information includes information related to signal quality for serving cell and/or neighbor cells.

13. The method of claim 1, wherein the wireless device is in communication with at least one of a user equipment, a network, or an autonomous vehicle other than the wireless device.

14. A wireless device, comprising:
a transceiver;
a memory; and
at least one processor operatively coupled to the transceiver and the memory, and configured to:
receive, from a network, information for a Preconfigured Uplink Resource (PUR) for data transmission while in idle state or inactive state;
receive, from the network, a report configuration information for data logging;
receive, from the network, information for a threshold value for data transmission based on the PUR;
configure a logging validity timer for failure reporting of data transmissions;
start the logging validity timer upon entering into idle state or inactive state;
attempt one or more data transmissions based on the PUR to the network while in idle state or inactive state;
increment a counter upon detecting a failure of the attempted data transmission based on the PUR;
perform the data logging based on the report configuration upon detecting the failure of the attempted data transmission only while the logging validity timer is running,
wherein logged information includes the (i) information informing that the data transmission is attempted based on the PUR, (ii) information related to the detected failure, and (iii) information related to the counter for the detected failure;
establish or resume a Radio Resource Control (RRC) connection with the network based on the counter being reached to the threshold value; and
transmit, to the network, the logged information based on the RRC connection.

15. A non-transitory computer-readable medium having stored thereon a plurality of instructions, which, when executed by a processor of a wireless device, cause the wireless device to:
receive, from a network, information for a Preconfigured Uplink Resource (PUR) for data transmission while in idle state or inactive state;
receive, from the network, a report configuration information for data logging;
receive, from the network, information for a threshold value for data transmission based on the PUR;
configure a logging validity timer for failure reporting of data transmissions;
start the logging validity timer upon entering into idle state or inactive state;
attempt one or more data transmissions based on the PUR to the network while in idle state or inactive state;
increment a counter upon detecting a failure of the attempted data transmission based on the PUR;
perform the data logging based on the report configuration upon detecting the failure of the attempted data transmission only while the logging validity timer is running,
wherein logged information includes the (i) information informing that the data transmission is attempted based on the PUR, (ii) information related to the detected failure, and (iii) information related to the counter for the detected failure;
establish or resume a Radio Resource Control (RRC) connection with the network based on the counter being reached to the threshold value; and
transmit, to the network, the logged information based on the RRC connection.

* * * * *